(12) United States Patent
Nguyen et al.

(10) Patent No.: US 11,378,460 B2
(45) Date of Patent: *Jul. 5, 2022

(54) THERMAL DETECTION SYSTEMS, METHODS, AND DEVICES

(71) Applicant: MILWAUKEE ELECTRIC TOOL CORPORATION, Brookfield, WI (US)

(72) Inventors: Evans H. Nguyen, Renton, WA (US); Matthew J. Mergener, Germantown, WI (US); Wade Burch, Wauwatosa, WI (US); James V. Curtin, Seattle, WA (US); Zachary P. Haas, Seattle, WA (US); Benjamin Oliver Ryan Cabot, Seattle, WA (US); Gareth Mueckl, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,980

(22) Filed: Sep. 28, 2020

(65) Prior Publication Data

US 2021/0010869 A1  Jan. 14, 2021

Related U.S. Application Data

(63) Continuation of application No. 13/803,875, filed on Mar. 14, 2013, now Pat. No. 10,794,769.

(Continued)

(51) Int. Cl.
*G01J 5/12* (2006.01)
*G01J 5/08* (2022.01)
(Continued)

(52) U.S. Cl.
CPC ............ *G01J 5/12* (2013.01); *G01J 5/025* (2013.01); *G01J 5/028* (2013.01); *G01J 5/0265* (2013.01);
(Continued)

(58) Field of Classification Search
None
See application file for complete search history.

(56) References Cited

U.S. PATENT DOCUMENTS

| 3,017,513 A | 1/1962 | Messelt |
| 3,147,682 A | 9/1964 | Lind, Jr. et al. |

(Continued)

FOREIGN PATENT DOCUMENTS

| CN | 101111748 | 1/2008 |
| EP | 1956833 | 8/2008 |

(Continued)

OTHER PUBLICATIONS

Agema Infrared Systems, Thermovision 782 Series Digital Image Processing System (DIPS), product specification brochure, 6 pages, Pub. No. 556, Sweden (1985).

(Continued)

*Primary Examiner* — Stefan Gadomski
(74) *Attorney, Agent, or Firm* — Michael Best & Friedrich LLP

(57) ABSTRACT

Systems, methods, and devices for thermal detection. A thermal detection device includes a visual sensor, a thermal sensor (e.g., a thermopile array), a controller, a user interface, a display, and a removable and rechargeable battery pack. The thermal detection device also includes a plurality of additional software and hardware modules configured to perform or execute various functions and operations of the thermal detection device. An output from the visual sensor and an output from the thermal sensor are combined by the controller or the plurality of additional modules to generate a combined image for display on the display.

20 Claims, 14 Drawing Sheets

Related U.S. Application Data

(60) Provisional application No. 61/678,692, filed on Aug. 2, 2012.

(51) Int. Cl.

| | | |
|---|---|---|
| *G01J 5/02* | (2022.01) | |
| *G01J 5/04* | (2006.01) | |
| *G01J 5/0806* | (2022.01) | |
| *G01J 5/061* | (2022.01) | |
| *G01J 5/00* | (2022.01) | |
| *G01J 5/06* | (2022.01) | |
| *G01J 5/80* | (2022.01) | |

(52) U.S. Cl.
CPC ............... *G01J 5/04* (2013.01); *G01J 5/061* (2013.01); *G01J 5/084* (2013.01); *G01J 5/0806* (2013.01); *G01J 5/0859* (2013.01); *G01J 5/064* (2022.01); *G01J 5/80* (2022.01); *G01J 2005/0077* (2013.01)

(56) References Cited

U.S. PATENT DOCUMENTS

| | | |
|---|---|---|
| 3,646,267 A | 2/1972 | Tompsett |
| 4,238,728 A | 12/1980 | Wells, Jr. et al. |
| 4,343,182 A | 8/1982 | Pompei |
| 4,494,042 A | 1/1985 | Roche |
| 4,529,912 A | 7/1985 | Northrup et al. |
| 4,590,429 A | 5/1986 | Sell |
| 4,617,519 A | 10/1986 | Rosenthal |
| 4,687,344 A | 8/1987 | Lillquist |
| 4,779,687 A | 10/1988 | Schreiber et al. |
| 4,779,739 A | 10/1988 | Carl et al. |
| 4,842,147 A | 6/1989 | Carl et al. |
| 4,922,185 A | 5/1990 | Davidson et al. |
| 4,943,752 A | 7/1990 | Todd et al. |
| 4,999,614 A | 3/1991 | Ueda et al. |
| 5,005,083 A | 4/1991 | Grage et al. |
| 5,008,626 A | 4/1991 | Boyd, Sr. |
| 5,045,937 A | 9/1991 | Myrick |
| 5,140,416 A | 8/1992 | Tinkler |
| 5,179,339 A | 1/1993 | Volk, Jr. |
| 5,319,312 A | 6/1994 | Segillia |
| 5,369,363 A | 11/1994 | Hey |
| 5,434,510 A | 7/1995 | Halstead |
| 5,453,683 A | 9/1995 | Pagano |
| 5,512,748 A | 4/1996 | Hanson |
| 5,528,147 A | 6/1996 | Konopka |
| 5,534,695 A | 7/1996 | Miyoshi et al. |
| 5,539,317 A | 7/1996 | Janning |
| 5,637,871 A | 6/1997 | Piety et al. |
| 5,666,029 A | 9/1997 | McDonald |
| 5,677,532 A | 10/1997 | Duncan et al. |
| 5,732,302 A | 3/1998 | Yokota |
| 5,763,885 A | 6/1998 | Murphy |
| 5,789,622 A | 8/1998 | Quon |
| 5,936,245 A | 8/1999 | Giollot et al. |
| 5,952,832 A | 9/1999 | Stevanovic et al. |
| 5,994,701 A | 11/1999 | Tsuchimoto et al. |
| 6,009,340 A | 12/1999 | Hsia |
| 6,028,312 A | 2/2000 | Wadsworth et al. |
| 6,033,130 A | 3/2000 | Muroi et al. |
| 6,115,559 A | 9/2000 | Balling et al. |
| 6,133,569 A | 10/2000 | Shoda |
| 6,232,602 B1 | 5/2001 | Kerr |
| 6,249,002 B1 | 6/2001 | Butler |
| 6,255,650 B1 | 7/2001 | Warner et al. |
| 6,292,311 B1 | 9/2001 | Bohn et al. |
| 6,335,478 B1 | 1/2002 | Chou et al. |
| 6,373,055 B1 | 4/2002 | Kerr |
| 6,480,001 B2 | 11/2002 | Frederick |
| 6,486,473 B2 | 11/2002 | Salapow et al. |
| 6,534,988 B2 | 3/2003 | Flory, IV |
| D472,911 S | 4/2003 | Bielefeld |
| 6,559,447 B2 | 5/2003 | Wood |
| 6,603,302 B2 | 8/2003 | Prineppi |
| 6,606,115 B1 | 8/2003 | Alicandro et al. |
| 6,630,674 B2 | 10/2003 | Knauth et al. |
| 6,649,912 B2 | 11/2003 | Salapow et al. |
| 6,682,381 B1 | 1/2004 | Michael |
| 6,707,044 B2 | 3/2004 | Lannestedt et al. |
| 6,722,184 B2 | 4/2004 | Bennette et al. |
| 6,730,909 B2 | 5/2004 | Butler |
| 6,734,678 B2 | 5/2004 | Frederick |
| 6,777,942 B2 | 8/2004 | Schadhauser |
| 6,784,667 B2 | 8/2004 | Belenger et al. |
| 6,787,775 B1 | 9/2004 | Bielefeld et al. |
| 6,795,209 B1 | 9/2004 | Patton et al. |
| 6,806,469 B2 | 10/2004 | Kerr |
| 6,849,849 B1 | 2/2005 | Warner et al. |
| 6,956,603 B2 | 10/2005 | Fujii |
| 6,967,445 B1 | 11/2005 | Jewell et al. |
| 7,030,378 B2 | 4/2006 | Allen et al. |
| 7,034,543 B2 | 4/2006 | Iwasawa |
| 7,049,822 B2 | 5/2006 | Kung |
| 7,064,554 B2 | 6/2006 | Moore |
| 7,093,974 B2 | 8/2006 | Kienitz |
| 7,102,130 B2 | 9/2006 | Kerr |
| 7,105,796 B2 | 9/2006 | Lewis et al. |
| 7,105,818 B2 | 9/2006 | Anderson et al. |
| 7,145,342 B2 | 12/2006 | Wendt et al. |
| 7,157,705 B2 | 1/2007 | Hamrelius et al. |
| 7,182,529 B2 | 2/2007 | Kurosawa |
| 7,183,549 B2 | 2/2007 | Teich et al. |
| 7,208,733 B2 | 4/2007 | Mian et al. |
| 7,231,307 B2 | 6/2007 | Takei et al. |
| 7,250,603 B1 | 7/2007 | Nugent |
| 7,250,769 B1 | 7/2007 | Olson |
| 7,304,297 B1 | 12/2007 | King et al. |
| 7,312,822 B2 | 12/2007 | Lannestedt et al. |
| 7,321,119 B2 | 1/2008 | King |
| 7,336,823 B2 | 2/2008 | Guldevall |
| 7,365,771 B2 | 4/2008 | Kahn et al. |
| 7,369,174 B2 | 5/2008 | Olita et al. |
| 7,381,952 B2 | 6/2008 | Teich et al. |
| 7,411,193 B2 | 8/2008 | Warner et al. |
| 7,422,365 B2 | 9/2008 | Chamberlain |
| 7,423,272 B2 | 9/2008 | Hasegawa et al. |
| 7,445,377 B2 | 11/2008 | Lee et al. |
| 7,457,441 B2 | 11/2008 | Hartlove |
| 7,483,208 B2 | 1/2009 | Zadravec |
| 7,508,605 B2 | 3/2009 | Nishikawa et al. |
| 7,519,210 B2 | 4/2009 | Hirsch et al. |
| 7,528,372 B2 | 5/2009 | Garvey, III et al. |
| 7,535,002 B2 | 5/2009 | Johnson et al. |
| 7,538,326 B2 | 5/2009 | Johnson et al. |
| 7,541,581 B2 | 6/2009 | Reed et al. |
| 7,596,281 B2 | 9/2009 | Irani et al. |
| 7,611,277 B2 | 11/2009 | Hebrank et al. |
| 7,642,515 B2 | 1/2010 | Tinnes |
| 7,649,174 B2 | 1/2010 | Mammen et al. |
| 7,652,251 B1 | 1/2010 | King |
| 7,655,908 B2 | 2/2010 | Kerr |
| 7,693,679 B1 | 4/2010 | Warnke et al. |
| 7,767,963 B1 | 8/2010 | Fujii |
| 7,867,019 B1 | 1/2011 | Loukusa et al. |
| 7,880,777 B2 | 2/2011 | Anderson |
| 7,938,004 B1 | 5/2011 | Brunsch, Jr. et al. |
| 7,959,353 B2 | 6/2011 | Anantharaman |
| 7,959,458 B2 | 6/2011 | Loukusa et al. |
| 8,235,590 B2 | 8/2012 | Sheard et al. |
| 8,378,290 B1 * | 2/2013 | Speake ................. G01J 5/0806 250/252.1 |
| 2002/0074499 A1 | 6/2002 | Butler |
| 2002/0109508 A1 | 8/2002 | Huang |
| 2002/0162963 A1 | 11/2002 | Lannestedt et al. |
| 2003/0025492 A1 | 2/2003 | Prineppi |
| 2003/0057371 A1 | 3/2003 | Wood |
| 2003/0146383 A1 | 8/2003 | Knauth |
| 2004/0239778 A1 | 12/2004 | Soga |
| 2005/0077469 A1 | 4/2005 | Kaushal |
| 2005/0104995 A1 | 5/2005 | Spryshak et al. |
| 2005/0168573 A1 | 8/2005 | Dennis et al. |

(56) References Cited

U.S. PATENT DOCUMENTS

| | | | |
|---|---|---|---|
| 2006/0086815 | A1 | 4/2006 | Kang |
| 2006/0175549 | A1 | 8/2006 | Miller et al. |
| 2006/0249679 | A1 | 11/2006 | Johnson et al. |
| 2006/0261271 | A1 | 11/2006 | Lee |
| 2007/0074035 | A1 | 3/2007 | Scanlon et al. |
| 2007/0096024 | A1 | 5/2007 | Furuya et al. |
| 2007/0217036 | A1 | 9/2007 | Miyauchi et al. |
| 2007/0247517 | A1 | 10/2007 | Zhang et al. |
| 2007/0288993 | A1 | 12/2007 | Sakai et al. |
| 2008/0061791 | A1 | 3/2008 | Joos et al. |
| 2008/0231803 | A1 | 9/2008 | Feldon et al. |
| 2008/0265162 | A1 | 10/2008 | Hamrelius et al. |
| 2008/0278833 | A1 | 11/2008 | Yuang |
| 2008/0315885 | A1 | 12/2008 | Andresen et al. |
| 2009/0001269 | A1 | 1/2009 | Tadano |
| 2009/0029842 | A1 | 1/2009 | Khrapko et al. |
| 2009/0050806 | A1 | 2/2009 | Schmidt et al. |
| 2009/0090864 | A1 | 4/2009 | Glatzmaier et al. |
| 2009/0102925 | A1 | 4/2009 | Sheard et al. |
| 2009/0121135 | A1 | 5/2009 | Warner et al. |
| 2009/0136093 | A1 | 5/2009 | Hartlove |
| 2009/0206077 | A1 | 8/2009 | Melmon et al. |
| 2009/0229842 | A1 | 9/2009 | Gray |
| 2009/0294666 | A1 | 12/2009 | Hargel |
| 2009/0302219 | A1 | 12/2009 | Johnson et al. |
| 2009/0324213 | A1 | 12/2009 | Wang |
| 2010/0001187 | A1 | 1/2010 | Fenske et al. |
| 2010/0046577 | A1 | 2/2010 | Sheard et al. |
| 2010/0073493 | A1 | 3/2010 | Godfrey et al. |
| 2010/0127171 | A1 | 5/2010 | Johsson et al. |
| 2010/0148066 | A1 | 6/2010 | Stratmann et al. |
| 2010/0157450 | A1 | 6/2010 | Im et al. |
| 2010/0162206 | A1 | 6/2010 | Roth et al. |
| 2010/0201958 | A1 | 8/2010 | Hauf |
| 2010/0265431 | A1 | 10/2010 | Li |
| 2010/0309315 | A1 | 12/2010 | Hogasten et al. |
| 2011/0014812 | A1 | 1/2011 | Loukusa et al. |
| 2011/0169961 | A1 | 7/2011 | Wu |
| 2012/0249799 | A1 | 10/2012 | Shibata |
| 2013/0188058 | A1 | 7/2013 | Nguyen et al. |
| 2013/0248711 | A1* | 9/2013 | Lambkin .................. G01J 5/20 250/332 |

FOREIGN PATENT DOCUMENTS

| | | | | |
|---|---|---|---|---|
| EP | 2278288 | | 1/2011 | |
| GB | 2481090 | A * | 12/2011 | ......... H04N 5/35581 |
| JP | 58050439 | | 3/1983 | |
| JP | 02064800 | | 3/1990 | |
| JP | 09178566 | | 7/1997 | |
| JP | 2001005437 | | 1/2001 | |
| KR | 20110044666 | | 4/2011 | |
| WO | 2000004493 | | 1/2000 | |
| WO | 2006060746 | | 6/2006 | |
| WO | 2012027739 | | 3/2012 | |
| WO | 2012125819 | | 9/2012 | |

OTHER PUBLICATIONS

Agema Infrared Systems, Thermovision 570 Series, operator's manual, 72 pages, Pub. No. 557 265, Ed. A, Sweden (Apr. 1997).
Agema Infrared Systems, Thermovision 550 Series, operator's manual, 74 pages, Pub. No. 557 084, Ed. B, Sweden (Sep. 1997).
Agema Infrared Systems, Thermovision 210 Series The First Team, operator's manual, 90 pages, Publication No. 1 557 627 Rev. A, Sweden (Oct. 23, 2002).
Agema Infrared Systems, Thermovision 400 Series, operator's manual, 56 pages, New Pub. No. 1 557 628, Rev. A, Sweden (Oct. 23, 2002).
Flir Systems—THERMACAM, Model 99 Database, operator's manual, 38 pages, Sweden (1999).
Flir Systems—THERMACAM, Model PM390 Hand-held IR Imaging Radiometers, operating instruction, pp. 1-125, Document No. 14882-000 Rev. B (1999).
Flir Systems—THERMACAM, Model PM595 High Performance Handheld Infrared Camera, The complete Predictive Maintenance Solution, brochure, 8 pages, North Billerica, USA (1999).
Flir Systems—THERMACAM, Model P65, user's manual, 246 pages, Publication No. 1557954 Rev. a55, USA (2006).
Flir Systems—THERMACAM, Model 2000 Reporter, operator's manual, pp. 1-249, Pub. No. 1 557 436 Version A, Sweden (1996-2000).
Inframetrics Inc., Model 522L Medical Infrared Imaging Radiometer, operator's manual, 62 pages, Document No. 06909-000 Rev. A, Waltham, USA (1990).
Inframetrics Inc., Model 760 Infrared Imaging Radiometer, operator's manual, 122 pages, Document No. 07137-000 Rev. C , Waltham, USA (1992).
Inframetrics Inc., Model 525-lmaging Radiometers for Applied Thermography, brochure, 40 pages, Bedford, USA, Aug. 1982, as evidenced by the attached Office of Scientific & Technical Information Report (see p. 7, 32, and 40).
Inframetrics Inc., Model 600 Equipment Setup, operations manual, 89 pages, Publication No. T559095 Rev. A, available at least as early as 1988, as evidenced by the attached Software Abstract from the Energy Science and Technology Software Center (see p. 89).
Inframetrics Inc., Model 700 Infrared Imaging Radiometer Features and Specifications, manual, 26 pages, Publication No. T559095 Rev. A, available at least as early as Dec. 1990, as evidenced by the attached Decision memo from the Comptroller General of the United States (see p. 22-24).
Inframetrics Inc., Model 535 Infrared Medical Thermography System, brochure, 15 pages, Billerica, USA, available at least as early as Aug. 18, 1998, as evidenced by the attached FDA 510(k) Summary (see pp. 11-13).
Inframetrics Inc., Model 520A Infrared Imaging Radiometer, operator's manual, 147 pages, Publication No. T559094 Rev. A, USA, available at least as early as 1983, as evidenced by the attached report on Big Strides in Refractory Management (see p. 142).
Inframetrics—THERMACAM, Model PM380 Infrared Imaging Radiometers, introduction and overview manual, 30 pages, USA (1996).
Inframetrics Inc.—THERMACAM, Model PM380 Infrared Predictive Maintenance in the Palm of your Hand, brochure, 4 pages, North Billerica, USA (1997).
Inframetrics—Thermacam, Model X90 Infrared FPA Predictive Maintenance System, brochure, 2 pages, USA (1998).
Inframetrics—Thermacam Ultra, Model PM395 Hand-held Infrared Imaging Radiometers, operating instructions, 121 pages, Publication No. T559098 Rev. A, North Billerica, USA, available at least as early as Oct. 19, 1998, as evidenced by the attached "Hot Products" Article on Design News (see p. 120).
International Search Report and Written Opinion for Application No. PCT/US2012/029217 dated Oct. 12, 2012 (10 pages).
Siemers, E., "Fluke Sued by Rival Flir" <http://www.bizjournal.com/seattle/stories/2010/08/16/daily45.html> Oregon Business Journal, webpage available since Aug. 20, 2010.
Atlas Copco Elektrowerkzeuge GmbH, Professional Quality Tools Catalogue 96/97 (Feb. 1996) 5 pages.
Atlas Copco, Professional Battery System PBS 3000 (1995) 3 pages.
International Search Report and Written Opinion for Application No. PCT/US2011/049541 dated Apr. 18, 2012 (8 pages).
Chinese Patent Office Action for Application No. 201180052026.5 dated Jul. 1, 2016 (4 pages).
United States Patent Office Action for U.S. Appl. No. 13/819,496 dated Nov. 25, 2015 (29 pgs).
Chinese Patent Office Action for Application No. 201180052026.5 dated Oct. 9, 2015 (16 pages).

* cited by examiner

THERMAL DETECTION SYSTEMS, METHODS, AND DEVICES

RELATED APPLICATIONS

This application is a continuation of U.S. patent application Ser. No. 13/803,875, filed Mar. 14, 2013, now U.S. Pat. No. 10,794,769, which claims the benefit of U.S. Provisional Patent Application No. 61/678,692, filed Aug. 2, 2012, the entire content of each are hereby incorporated by reference.

BACKGROUND

This invention relates to thermal detection systems, methods, and devices. Thermal detection devices, such as thermal detectors, are used by professionals in a variety of industries to assess temperatures of objects within a field-of-view ("FOV") of the thermal detector. The assessment of the scene includes, for example, generating a multi-color or multi-level contrast image of the scene and determining temperature measurements of the scene.

SUMMARY

Although thermal detection devices are known, many of the devices are prohibitively expensive due to, among other things, the detectors being used for thermal detection. For example, many thermal imagers use a high-resolution microbolometer as a detector. The use of high-resolution microbolometers in thermal imagers allows the thermal imagers to generate accurate thermal images of a scene, but also significantly increases the cost of the thermal imagers.

This invention provides thermal detection devices which are configured to generate relative or absolute temperature representations of a scene. In one embodiment, the invention provides a thermal detection device that includes a visual sensor, a thermopile array, a controller, a user interface, a display, and a removable and rechargeable battery pack. The thermal detection device also includes a plurality of additional software or hardware modules configured to perform or execute various functions and operations of the thermal detection device. An output from the visual sensor and an output from the thermopile array are combined by the controller or one of the plurality of additional modules to generate a combined image for display.

In one embodiment, the invention provides a thermal detection device that includes an outer housing, a visual camera, a thermopile array, a first control unit, a second control unit, and a display. The visual camera is configured to generate a first signal related to a visual image of a scene, and the thermopile array includes a plurality of pixels. The first control unit is connected to the thermopile array and is configured to generate a second signal related to a thermal image of the scene. The second signal is associated with a temperature sensed by at least one of the plurality of pixels in the thermopile array, and the first control unit is positioned within a sub-housing. The sub-housing includes at least one metallic side surface. The second control unit is electrically connected to the visual camera and the first control unit. The second control unit is configured to receive a temperature signal related to a temperature of the thermopile array, and compensate the second signal based on the temperature signal. The display is configured to display the visual image based on the first signal and the thermal image based on the compensated second signal.

In another embodiment, the invention provides a thermal detection device that includes a visual camera, a thermopile array, a rechargeable lithium-based battery pack, a controller, and a display. The thermopile array includes a plurality of pixels, and the rechargeable lithium-based battery pack is configured to be inserted into a handle portion of the thermal detection device for providing power to the thermal detection device. The controller includes a processor and a memory. The controller is configured to receive a first signal from the visual camera related to a visual image of a scene, receive a second signal from the thermopile array related to a thermal image of the scene and associated with a temperature sensed by at least one of the plurality of pixels in the thermopile array, receive a temperature signal related to a temperature of the thermopile array, and compensate the second signal based on the temperature signal. The display is configured to display the visual image based on the first signal and the thermal image based on the compensated second signal.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to thermal detection devices which detect and display a temperature characteristic of a scene. The thermal detection devices include a housing having a display portion, a user interface portion, a worklight portion, and a trigger portion. The thermal detection devices also include an optics portion, a thermal detector, and a controller or control unit for receiving signals from, among other things, the thermal detector, the trigger portion, and the user interface portion, conditioning and processing the received signals, and outputting the conditioned and processed signals to, for example, the display portion, the worklight portion, and the thermal detector. The thermal detection devices are powered by a removable and rechargeable battery pack which is connected to a battery pack receiving interface of the housing. The thermal detector is, for example, a thermopile array.

Figure 1A:
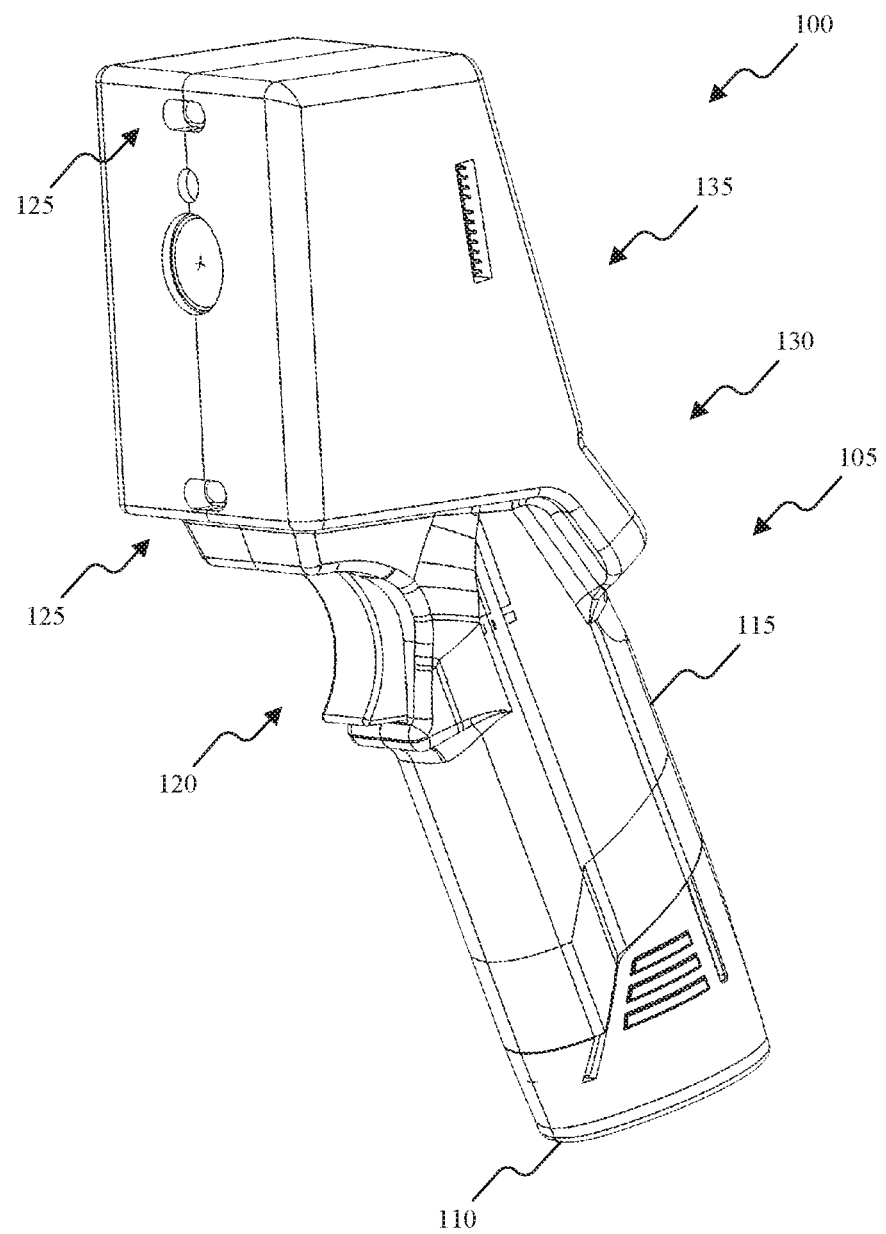
FIGS. 1A-1C illustrate a thermal detection device according to an embodiment of the invention.
Figure 1B:
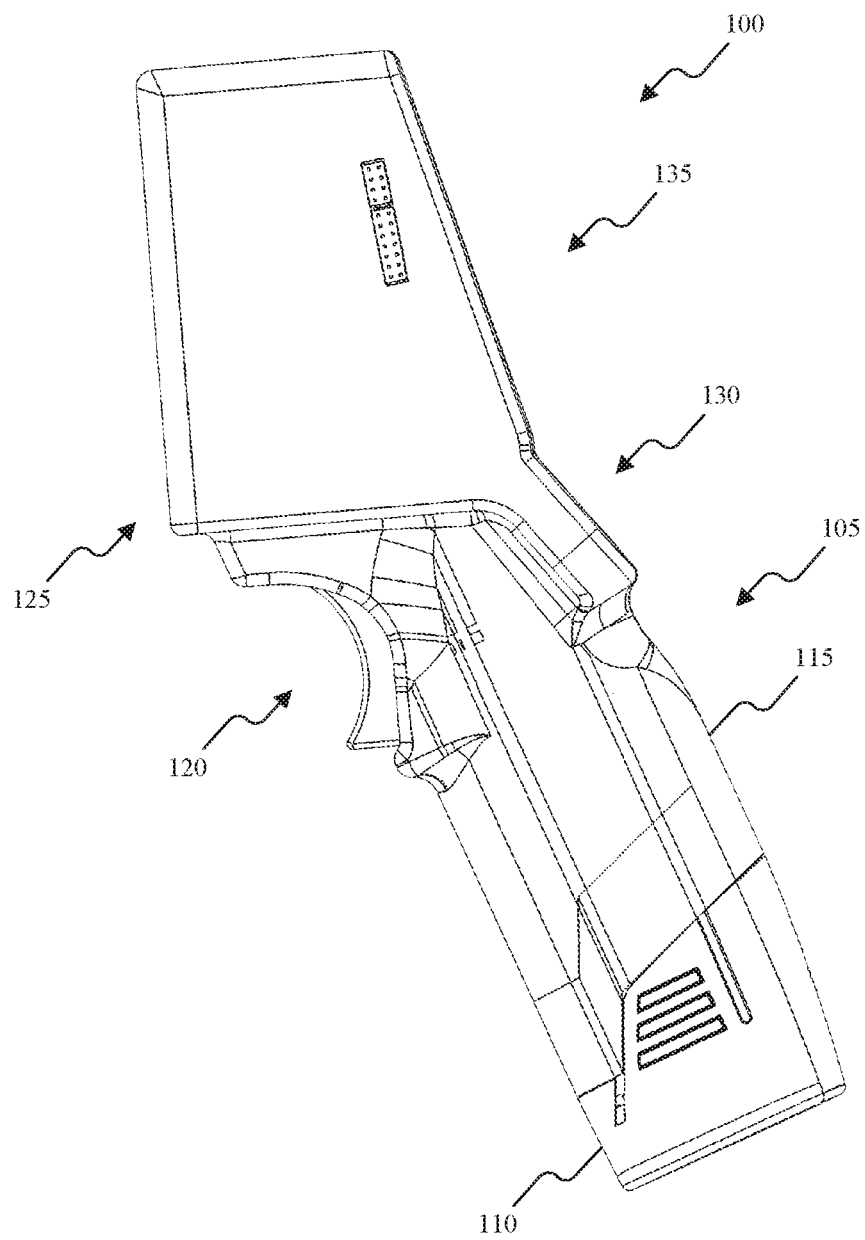
Figure 1C:
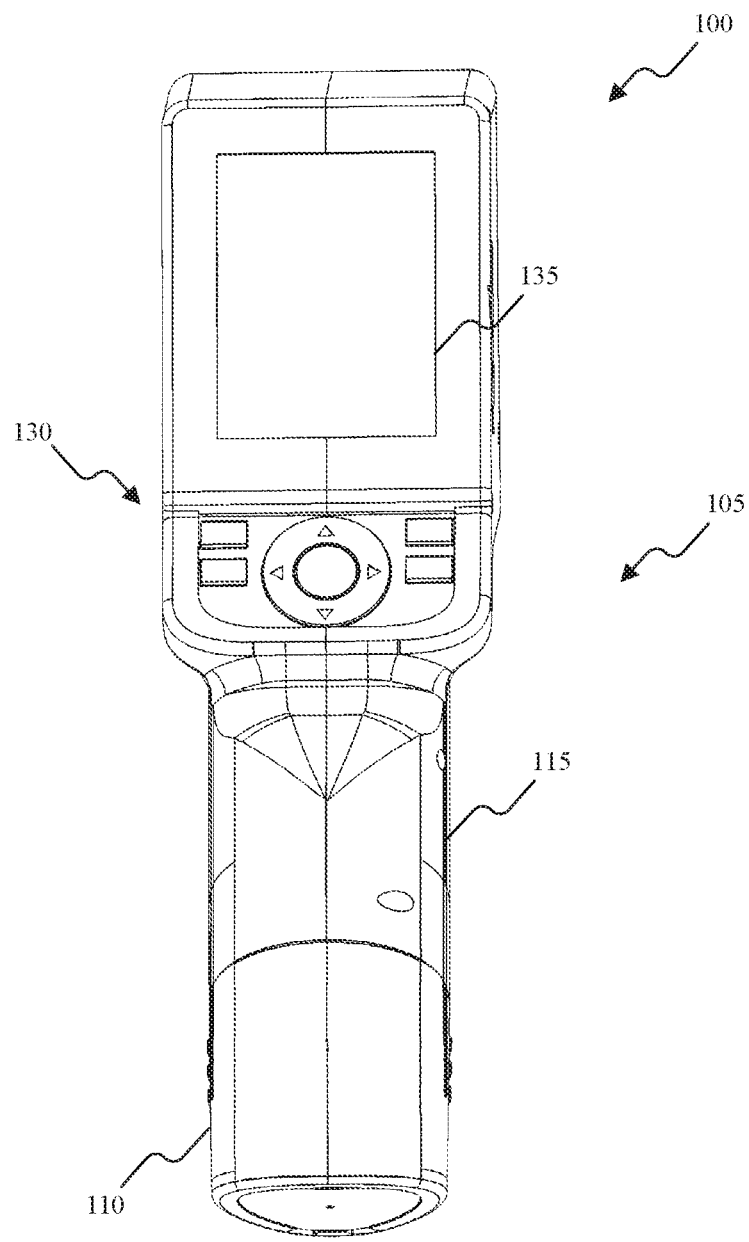

FIGS. 1A-1C illustrate a thermal detection device 100. The thermal detection device 100 includes a housing 105 and a battery pack 110. The housing 105 includes a handle 115, a trigger portion 120, a worklight portion 125, a thermal sensor portion (see FIG. 7), a user input portion 130, and a display portion 135. In some embodiments, the thermal detection device 100 also includes a laser pointer. The laser pointer is projected to, for example, the center of a detection area to aid the user in locating the detection area.

Figure 2:
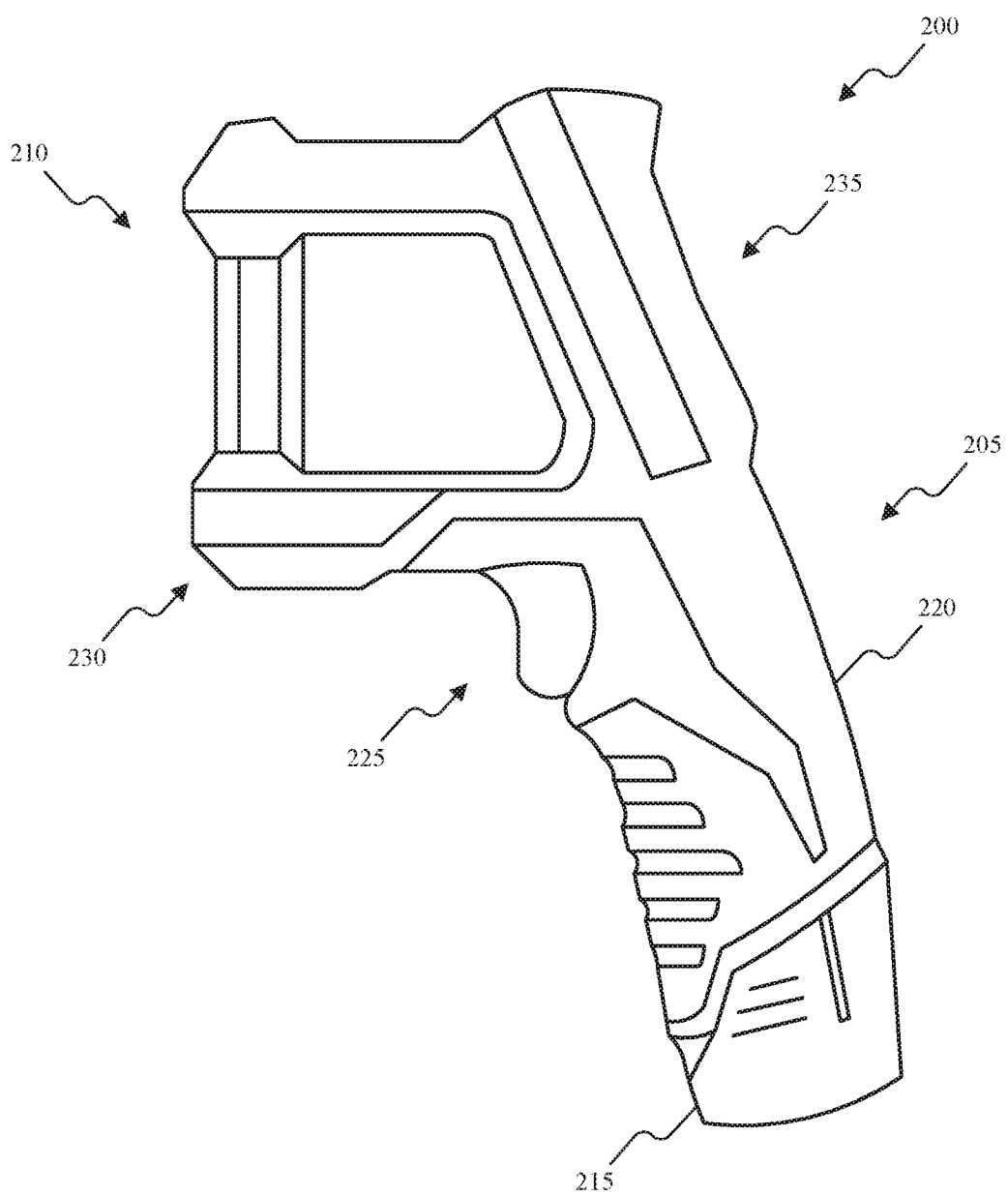
FIG. 2 illustrates a thermal detection device according to another embodiment of the invention.
Figure 3:
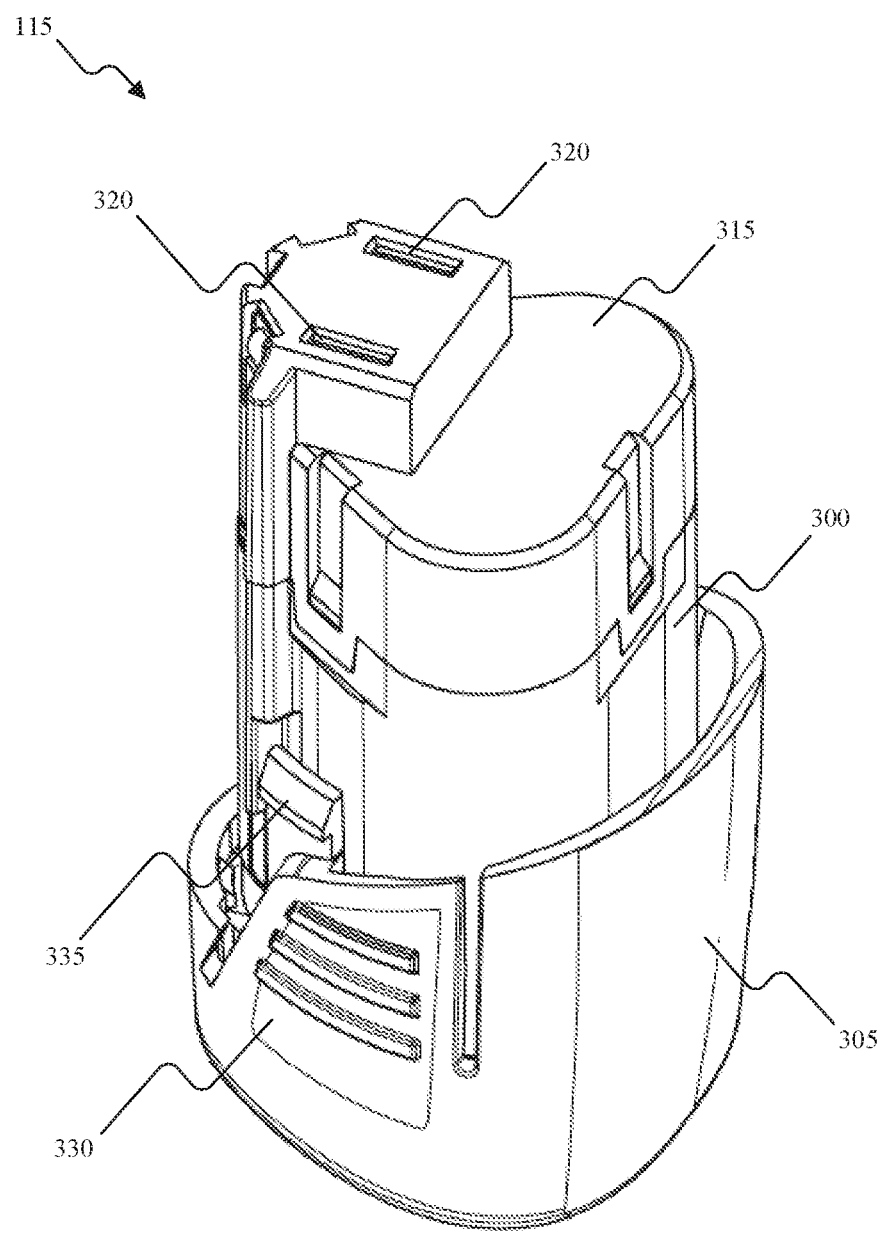
FIG. 3 is a perspective view of a battery pack according to an embodiment of the invention.

FIG. 2 illustrates another thermal detection device 200. The thermal detection device 200 is similar to the thermal detection device 100, and includes a housing 205, a lens cover 210, and a battery pack 215. The housing 205 includes a handle 220, a trigger portion 225, a worklight portion 230, a thermal sensor portion (see FIG. 7), and a user input and display portion 235. Embodiments of the invention described herein are described with respect to the thermal detection device 100.

The thermal sensor portion includes, among other things, the thermal sensor, optics for the thermal detection device, and a visual sensor. In some embodiments, the optics for the thermal detection device 100 include a single selectable or focusable lens configuration. In other embodiments, the optics for the thermal detection device 100 include a dual lens configuration. The lenses are made of, for example, fluorite, silicon, Germanium, calcium fluoride, Chalcgenide, Zinc Sulfur, Zinc Selenium, Sapphire, crown glass (e.g., BK-7), etc. In some embodiments, the optics for the thermal detection device are composed at least in part of Aluminum. The lenses have a depth of focus of approximately 2-6 feet. Dual lens configurations are implemented in embodiments of the invention in which, for example, improved resolution is desired. In dual lens embodiments, the inner lens is fixed, and the second lens is, for example, an aspheric lens. Embodiments of the invention described herein relate to single lens implementations of the thermal detection device 100.

The thermal sensor is, for example, a 32 pixel by 31 pixel (i.e., 32×31) thermopile array (i.e., thermal engine) positioned at the front end of the thermal detection device 100. As such, the thermopile array generates signals corresponding to a thermal image that is 32 pixels wide and 31 pixels long. In some embodiments, the thermal detection device 100 is not configured to provide absolute temperatures of a scene. In other embodiments, the thermal detection device 100 is configured to output absolute temperatures of a scene. The refresh rate of the thermal sensor is set to, for example, less than or equal to 9 Hz in accordance with government regulations. As is described in greater detail below with respect to a compensation module, the thermal sensor is highly sensitive to heat and temperature changes. In order to properly compensate for this sensitivity, sensors are used to measure temperature fluctuations caused by both internal and external heat sources.

The visual sensor is located at the front end of thermal detection device 100 and below the thermal sensor. The visual sensor is covered by a clear plastic shield for protection. The visual sensor has a resolution of between, for example, 0.01 and 12 megapixels. In some embodiments, the thermal detection device 100 includes two or more visual sensors. Images are captured by activating (e.g., depressing, releasing, holding, etc.) the trigger portion. In some embodiments, a single image based on the thermal sensor and a single image based on the visual sensor is captured at the time the trigger portion is activated. For example, each time the trigger portion is activated, a single visual image is captured and a single thermal image is captured. Each image is saved as a separate file having, for example, a corresponding time-stamp for identification. In some embodiments, when the trigger portion is activated, the image that is being displayed by the display portion is captured. In other embodiments, a series of images are captured based on the amount of time that the trigger is activated. The visual sensor is also configured for manual or automatic focusing and at least one of the visual sensor module or controller (both described below) is configured to execute one or more extended depth of focus ("EDOF") techniques. The visual sensor refresh rate is approximately, for example, 30 Hz. Higher refresh rates are possible for the visual sensor, but the perceptual effects of the increase in refresh rate are virtually indistinguishable by the human eye.

The display portion 135 and user interface portion 130 include a visual display and one or more user input devices (e.g., buttons), respectively. The visual display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), or the like. In some embodiments, the display is a 3.5" thin-film transistor ("TFT") LCD. In other embodiments, the display is a Super active-matrix OLED ("AMOLED") display. Displays are often rectangular in shape, and the outputs of the visual sensor or thermal sensor are often square in shape. As such, following the mapping of an output of a visual sensor or thermal sensor to the output display, there are unused pixels around the edges of the display. The output of the visual sensor, the output of the thermal sensor, or a combination of the two can be stretched to fit the screen. Additionally or alternatively, the unused pixels are black, or information is displayed in the unused pixels (e.g., menus, temperature data, etc.). The refresh rate of the display portion is approximately, for example, 30 Hz.

Figure 4:
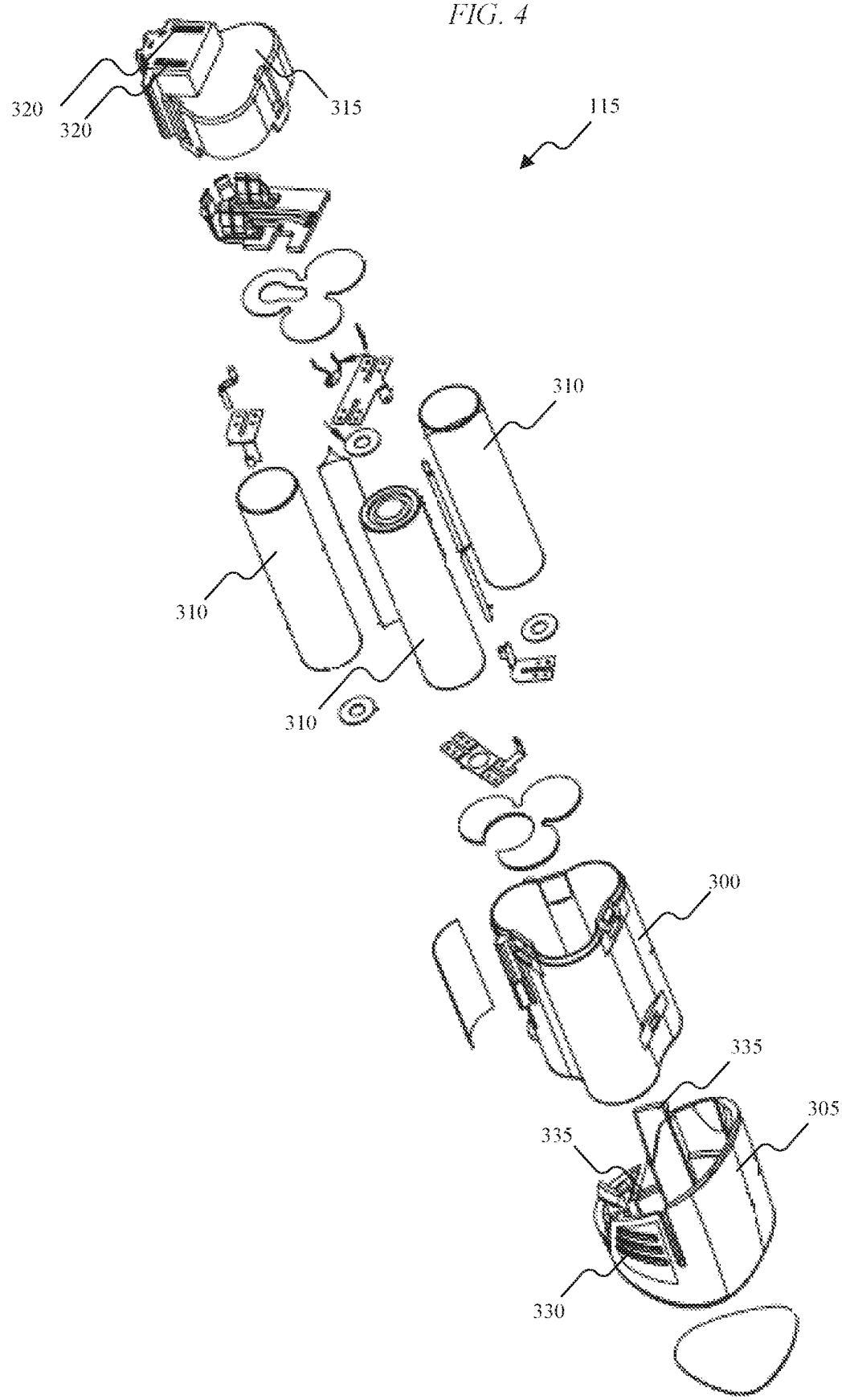
FIG. 4 is an exploded view of the battery pack of FIG. 3.

The housing 105 includes a battery pack interface within the handle 115 of the thermal detection device 100 for connecting to the battery pack 110. The battery pack 110 includes a casing 300, an outer housing 305 coupled to the casing 300, and a plurality of battery cells 310 (see FIG. 4) positioned within the casing 300. The casing 300 is shaped and sized to be at least partially received within the recess of the thermal detection device handle 115 to connect the battery pack 110 to the thermal detection device 100. The casing 300 includes an end cap 315 to substantially enclose the battery cells 310 within the casing 300. The illustrated end cap 315 includes two power terminals 320 configured to mate with corresponding power terminals of the thermal detection device 100. In other embodiments, the end cap 315 may include terminals that extend from the battery pack 110 and are configured to be received in receptacles supported by the thermal detection device 100. The end cap 315 also includes sense or communication terminals 325 (see FIG. 5) that are configured to mate with corresponding terminals from the thermal detection device 100. The terminals 325 couple to a battery circuit (not shown). The battery circuit can be configured to monitor various aspects of the battery pack 110, such as pack temperature, pack and/or cell state of charge, etc. and can also be configured to send and/or receive information and/or commands to and/or from the thermal detection device 100. In one embodiment, the battery circuit operates as illustrated and described in U.S. Pat. No. 7,157,882 entitled "METHOD AND SYSTEM FOR BATTERY PROTECTION EMPLOYING A SELECTIVELY-ACTUATED SWITCH," issued Jan. 2, 2007, the entire content of which is hereby incorporated by reference. In another embodiment, the battery circuit operates as illustrated and described in U.S. Pat. No. 7,589,500 entitled "METHOD AND SYSTEM FOR BATTERY PROTEC- TION," issued Sep. 15, 2009, the entire content of which is also hereby incorporated by reference.

The casing 300 and power terminals 320 substantially enclose and cover the terminals of the thermal detection device 100 when the pack 110 is positioned in the handle 115. That is, the battery pack 110 functions as a cover for the handle 115 and terminals of the thermal detection device 100. Once the battery pack 110 is disconnected from the device 100 and the casing is removed from the handle 115, the battery terminals on the thermal detection device 100 are generally exposed to the surrounding environment.

The outer housing 305 is integral with or coupled to an end of the casing 300 substantially opposite the end cap 315 and surrounds a portion of the casing 300. In the illustrated construction, when the casing 300 is inserted into, positioned within, or connected to the handle 115 of the thermal detection device 100, the outer housing 305 generally aligns with an outer surface of the handle 115. In this construction, the outer housing 305 is designed to substantially follow the contours of the device 100 to match the general shape of the handle 115 (e.g., the contours of the device 100 are complementary to contours of the outer housing 305). In such embodiments, the outer housing 305 generally increases (e.g., extends) the length of the handle 115 of the thermal detection device 100. The handle 115 is referred to as the portion of the thermal detection device 100 that is below the user input portion 130.

In the illustrated embodiment, two actuators 330 (only one of which is shown) and two tabs 335 are formed in the outer housing 305 of the battery pack 110. The actuators 330 and the tabs 335 define a coupling mechanism for releasably securing the battery pack 110 to the thermal detection device 100. Each tab 335 engages a corresponding recess formed in the thermal detection device 100 to secure the battery pack 110 in place. The tabs 335 are normally biased away from the casing 300 (i.e., away from each other) due to the resiliency of the material forming the outer housing 305. Actuating (e.g., depressing) the actuators 330 moves the tabs 335 toward the casing 300 (i.e., toward each other) and out of engagement with the recesses such that the battery pack 110 may be pulled out of the handle 115 and away from the thermal detection device 100. In some embodiments, the battery pack 110 is configured to be slidably attached to the housing 105. For example, the housing 105 can include a terminal that is configured to be engaged with a portion of the battery pack 110 such that the thermal sensor 100 is able to receive power from the battery pack 110. In such embodiments, a portion of the battery pack 110 is received in the housing 105 or a portion of the housing 105 is received in the battery pack 110. In such embodiments, the battery pack 110 also includes a coupling mechanism having one or more actuators 330 for releasably engaging the battery pack 110 and the housing 105.

Figure 5:
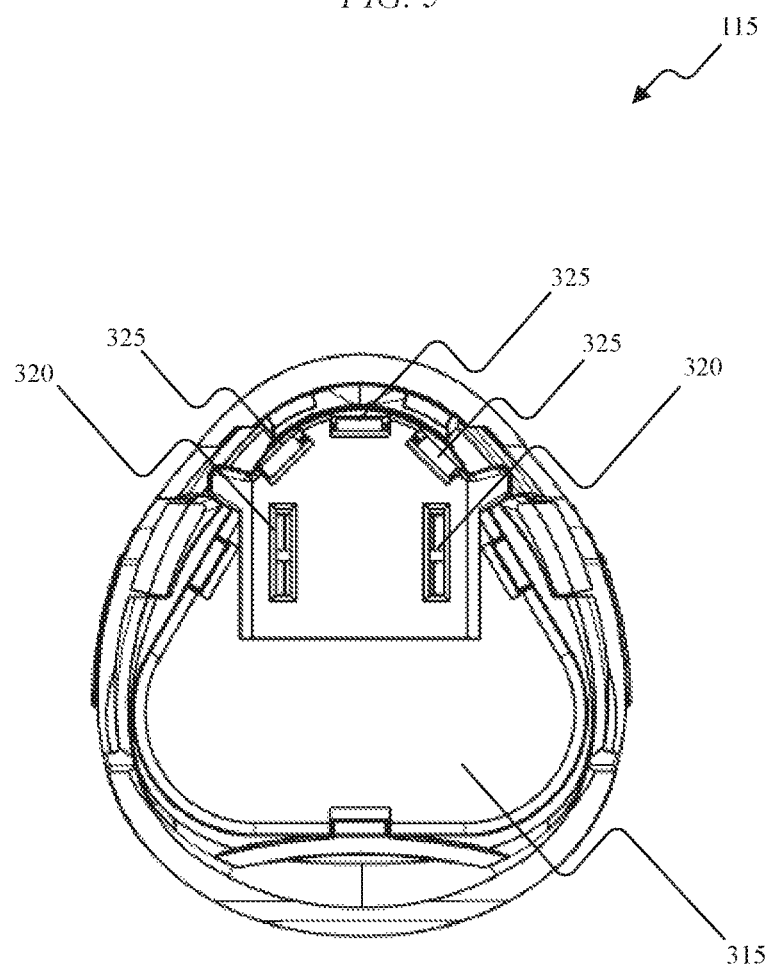
FIG. 5 is a top-view of the battery pack of FIG. 3.

As shown in FIG. 5, the battery pack 110 includes three battery cells 310 positioned within the casing 300 and electrically coupled to the terminals 320. The battery cells 310 provide operational power (e.g., DC power) to the thermal detection device 100. In the illustrated embodiment, the battery cells 310 are arranged in series, and each battery cell 310 has a nominal voltage of approximately four-volts ("4.0V"), such that the battery pack 110 has a nominal voltage of approximately twelve-volts ("12V"). The cells 310 also have a capacity rating of approximately 1.4 Ah. In other embodiments, the battery pack 110 may include more or fewer battery cells 310, and the cells 310 can be arranged in series, parallel, or a serial and parallel combination. For example, the battery pack 110 can include a total of six battery cells 310 in a parallel arrangement of two sets of three series-connected cells. The series-parallel combination of battery cells 310 creates a battery pack 110 having a nominal voltage of approximately 12V and a capacity rating of approximately 2.8 Ah. In other embodiments, the battery cells 310 may have different nominal voltages, such as, for example, 3.6V, 3.8V, 4.2V, etc., and/or may have different capacity ratings, such as, for example, 1.2 Ah, 1.3 Ah, 2.0 Ah, 2.4 Ah, 2.6 Ah, 3.0 Ah, etc. In other embodiments, the battery pack 110 can have a different nominal voltage, such as, for example, 10.8V, 14.4V, etc. In the illustrated embodiment, the battery cells 310 are lithium-ion battery cells having a chemistry of, for example, lithium-cobalt ("Li—Co"), lithium-manganese ("Li—Mn"), Li—Mn spinel, or including manganese. In other embodiments, the battery cells 310 may have other suitable lithium or lithium-based chemistries. In some embodiments, the thermal detection device 100 is powered by alkaline batteries such as AA, AAA, C, D, 9V, etc. batteries. The alkaline batteries can be connected in series, parallel, or a series-parallel combination to achieve a desired voltage for the thermal detection device 100.

The battery pack 110 is also configured to connect and provide power to additional devices such as drills, saws, grease guns, right angle drills, pipe cutters, lasers, impact wrenches, impact drivers, reciprocating saws, inspection cameras, radios, worklights, screwdrivers, wall scanners, infrared thermometers, clamp meters, digital multimeters, fork meters, multi-tools, grinders, band saws, jig saws, circular saws, rotary hammers, generators, vacuums, etc.

Figure 6:
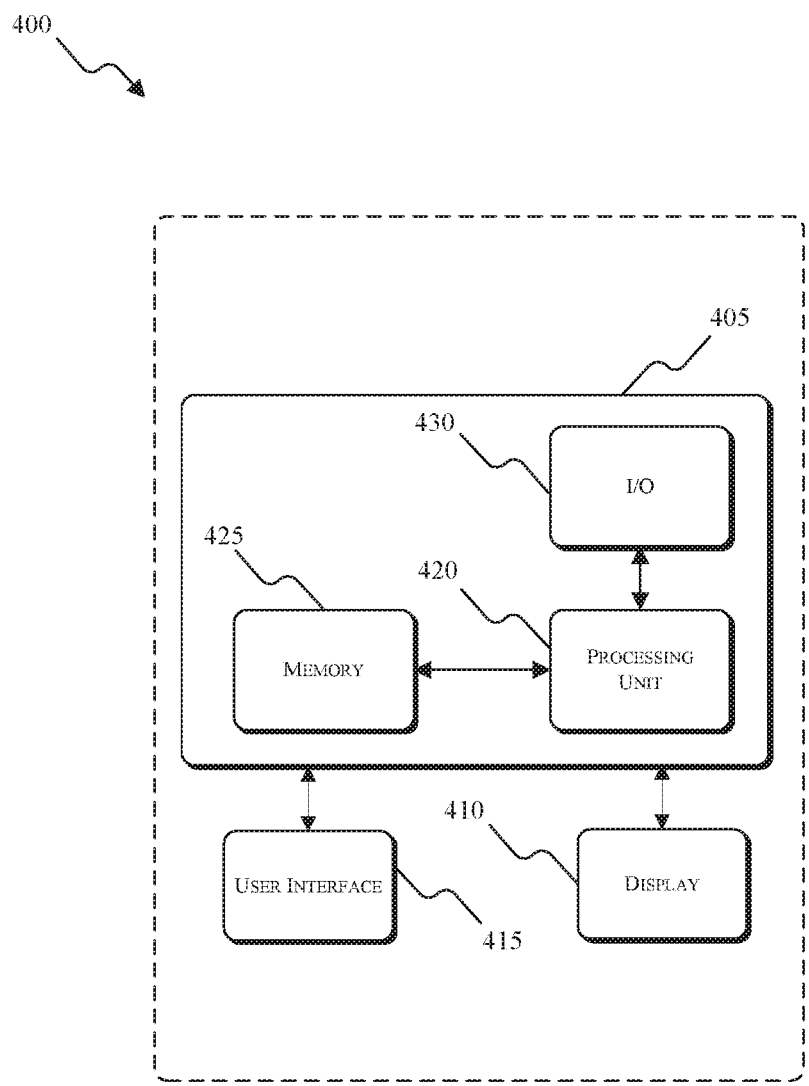
FIG. 6 illustrates a thermal detection device according to another embodiment of the invention.

In some embodiments, a battery pack controller is configured to provide information related to a battery pack temperature or voltage level to a controller of the thermal detection device 100, such as the thermal detection device controller 405 shown in and described with respect to FIG. 6. The thermal detection device controller 405 and the battery pack controller also include low voltage monitors and state-of-charge monitors. The monitors are used by the thermal detection device controller 405 or the battery pack controller to determine whether the battery pack 110 is experiencing a low voltage condition which may prevent proper operation of the thermal detection device 100, or if the battery pack 110 is in a state-of-charge that makes the battery pack 110 susceptible to being damaged. If such a low voltage condition or state-of-charge exists, the thermal detection device 100 is shut down or the battery pack 110 is otherwise prevented from further discharging current to prevent the battery pack 110 from becoming further depleted. In some embodiments, the detection device 100 senses a voltage associated with one or more cells of the battery pack 110 via the sense or communication terminal.

Figure 7:
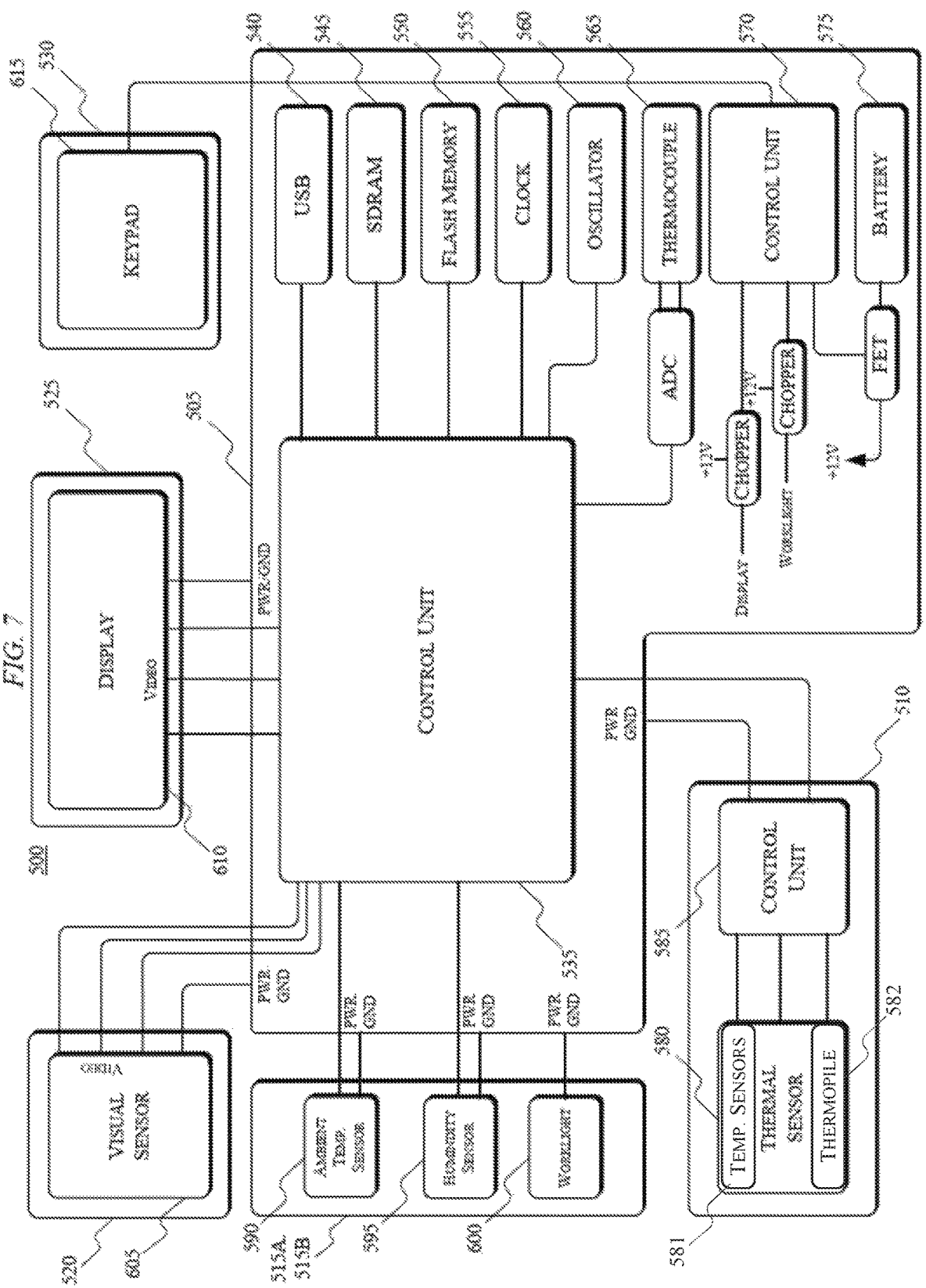
FIG. 7 illustrates is a schematic block diagram of a thermal detection device according to an embodiment of the invention.
Figure 8:
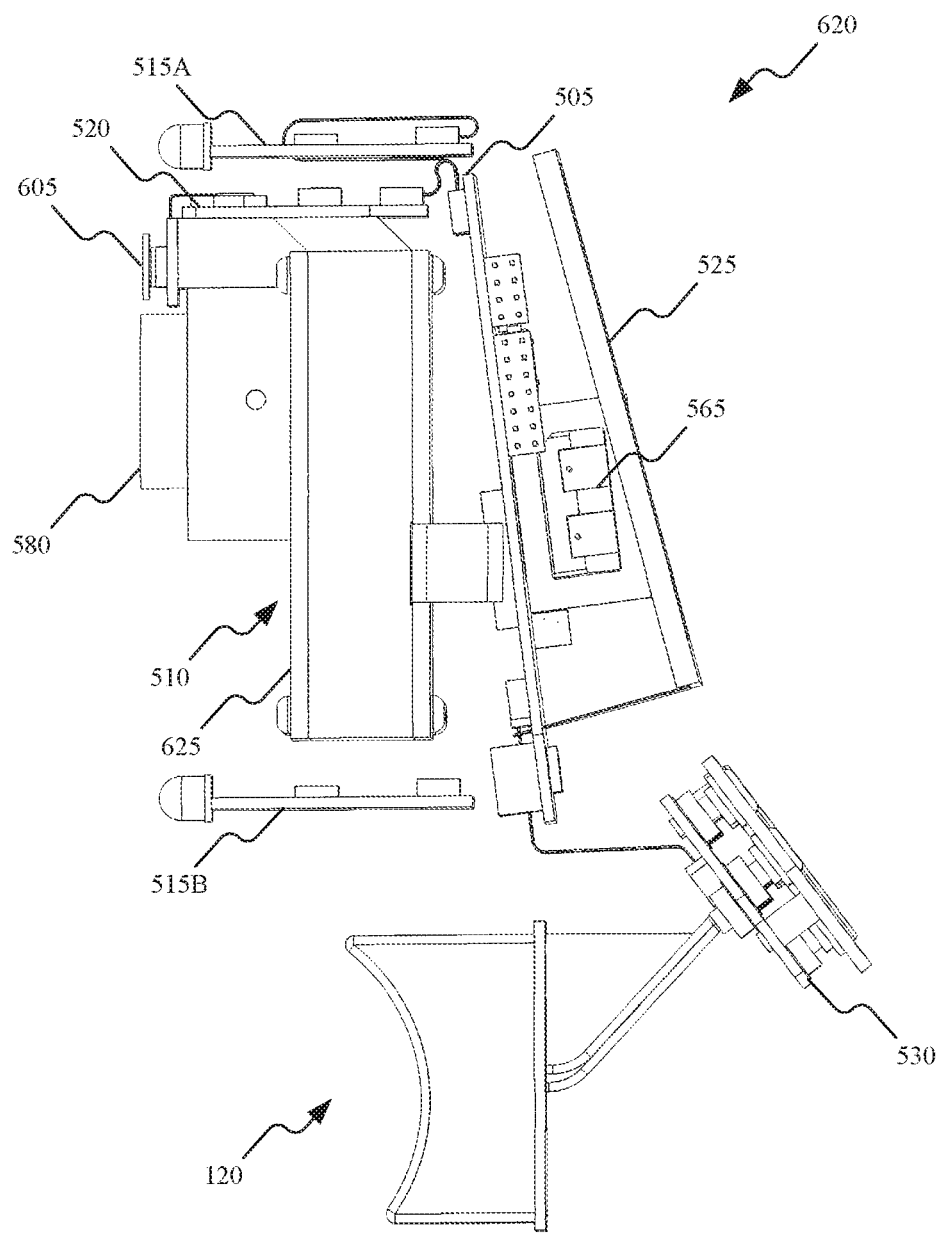
FIGS. 8-12 illustrate an assembly of thermal detector components according to an embodiment of the invention.
Figure 9:
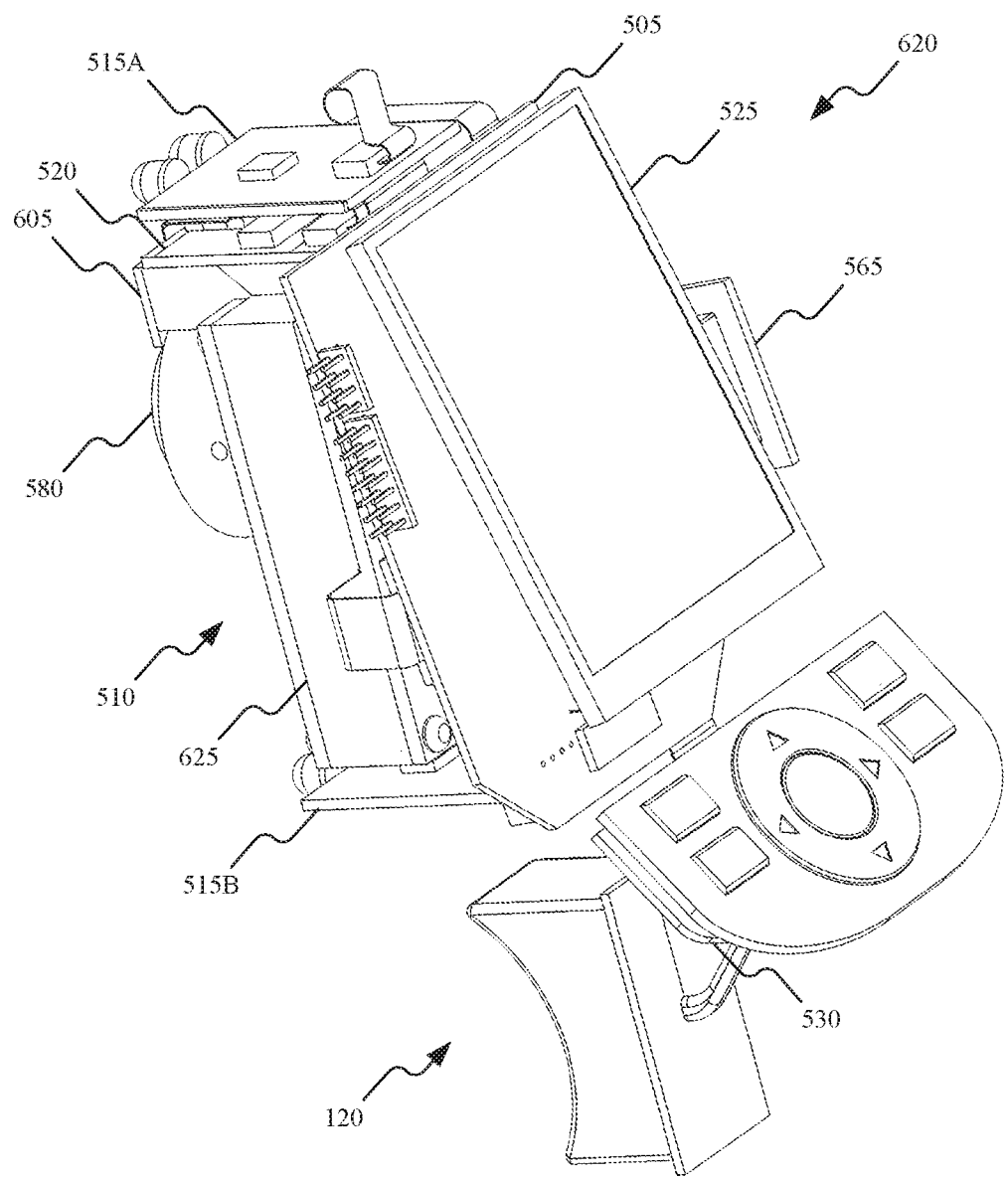
Figure 10:
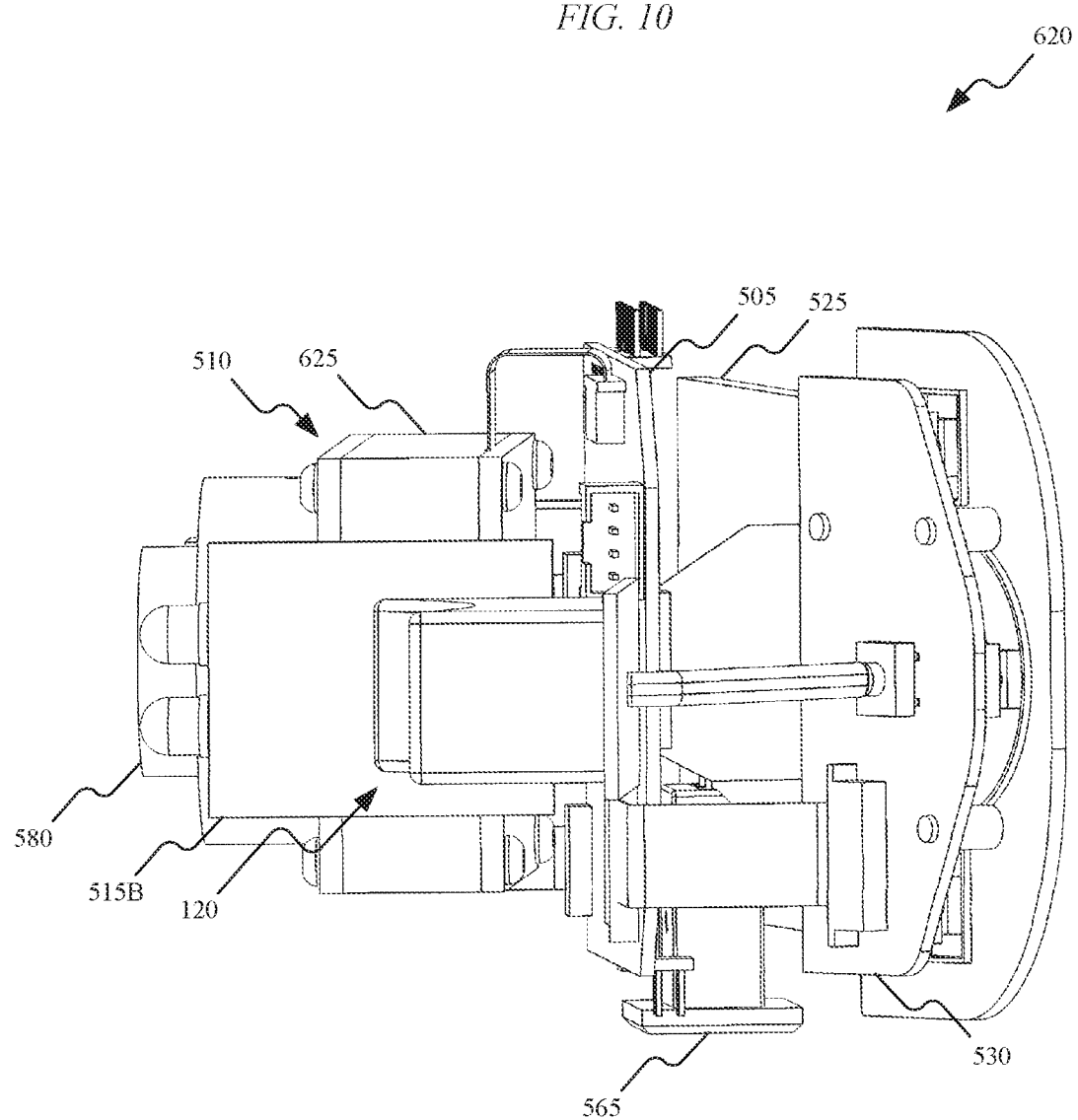
Figure 11:
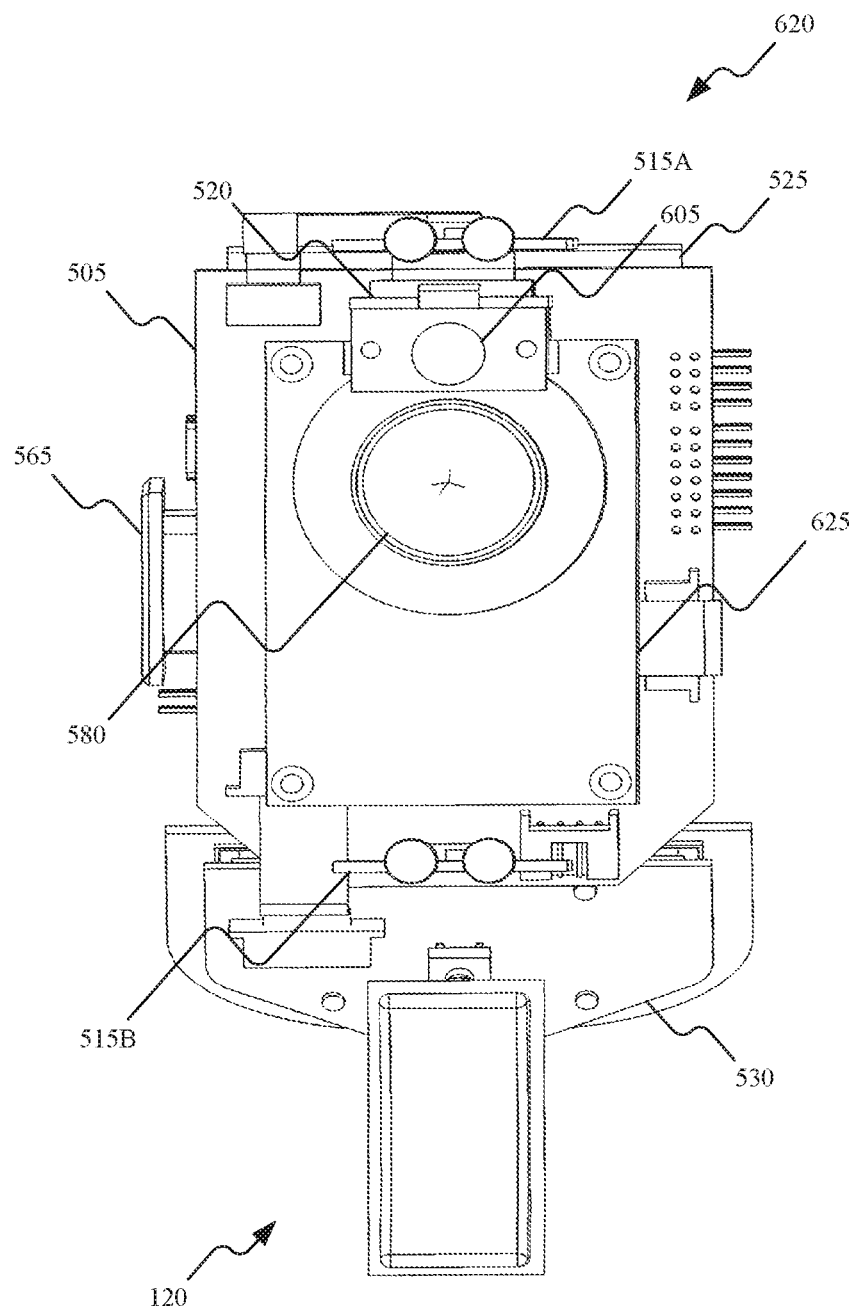
Figure 12:
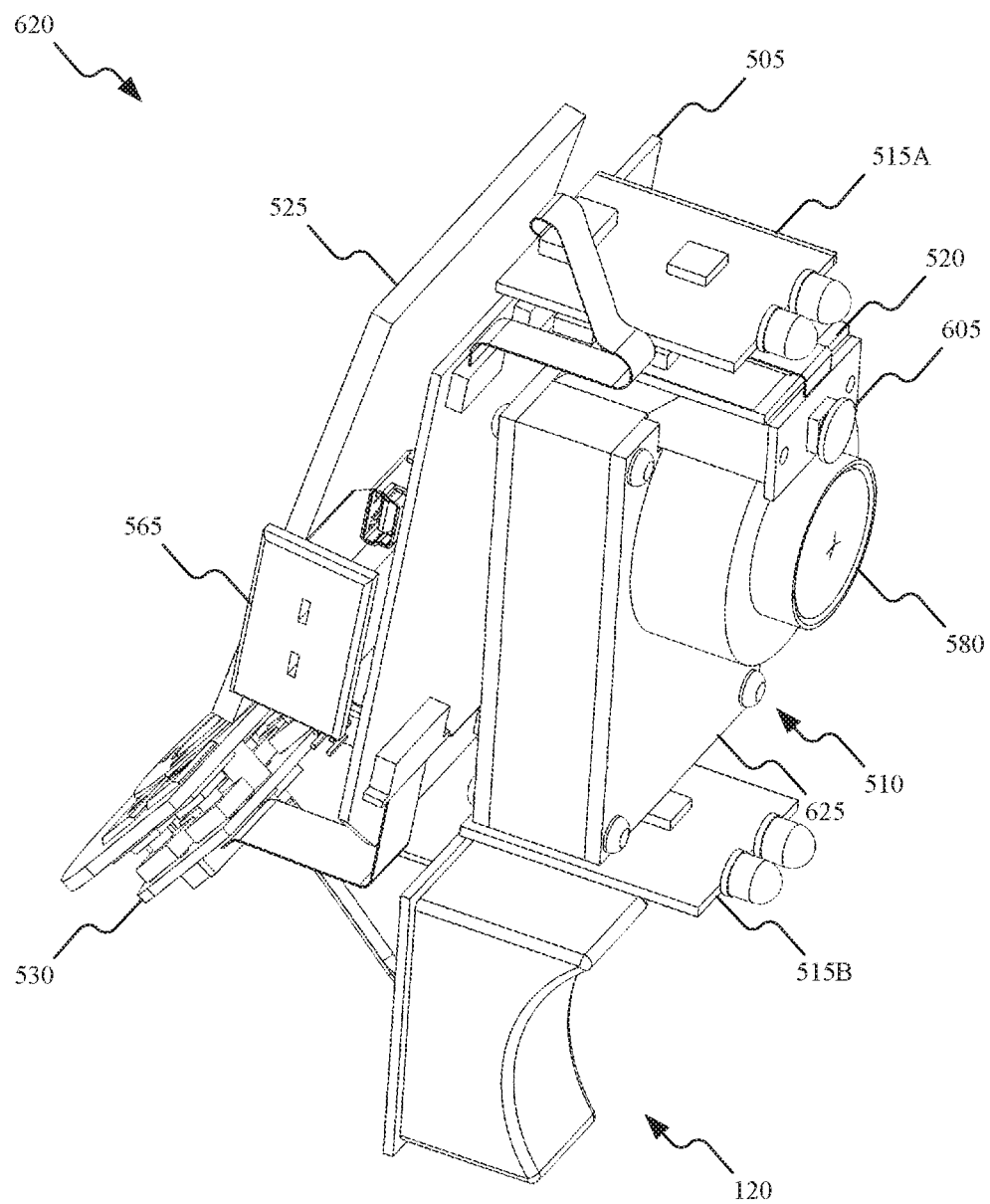

The thermal detection devices 100 and 200 described above are illustrated modularly as a thermal detection device 400 in FIGS. 6 and 500 in FIG. 7. The shape and structure of the thermal detection devices 400 and 500 is described above with respect to the thermal detection devices 100 and 200. The thermal detection device 400 generally includes, among other things, a controller 405, a display 410, and a user interface 415. The controller 405 is implemented on, for example, one or more printed circuit boards ("PCBs"). The PCBs are populated with a plurality of electrical and electronic components which provide operational control and protection to the thermal detection device 400. In some embodiments, the PCBs include a control or processing unit 420 such as a microprocessor, a microcontroller, or the like, a memory 425, an input/output ("I/O") interface 430, and a bus. The bus connects various components of the controller 405 including the memory to the processing unit. The memory 425 includes, for example, a read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The controller 405 also includes an input/output system that includes routines for transferring information between components within the controller 405. Software included in the implementation of the thermal detection device 400 is stored in the memory of the controller 405. The software includes, for example, firmware applications and other executable instructions. The processing unit 420 is connected to the memory 425 and executes software instructions that are capable of being stored in a RAM of the memory 425 (e.g., during execution), a ROM of the memory 425 (e.g., on a generally permanent basis), or another non-transitory computer readable medium such as another memory or a disc. In other embodiments, the controller 405 can include additional, fewer, or different components.

The PCB also includes, among other things, a plurality of additional passive and active components such as resistors, capacitors, inductors, integrated circuits, and amplifiers. These components are arranged and connected to provide a plurality of functions to the PCB including, among other things, filtering, signal conditioning, and voltage regulation. For descriptive purposes, the PCB and the electrical components populated on the PCB are collectively referred to as "the controller" 405. The controller 405 includes or receives signals from the sensors or components within the thermal detection device 100, conditions and processes the signals, and transmits processed and conditioned signals to, for example, the display.

With reference to FIG. 7 and thermal detection device 500, the thermal detection device 500 includes a plurality of modules configured to provide operative control to the thermal detection device 500. The modules include, for example, hardware, software, or combinations of hardware and software configured to achieve the desired function of each module. As an illustrative example, each module can include hardware (e.g., electrical circuit components, displays, sensors, etc.) and software (e.g., functions, subroutines, executable programs, etc.) associated with the functional and operative control of the module. In the embodiment of the invention illustrated in FIG. 7, the thermal detection device 500 includes a variety of modules and components implemented on one or more printed circuit boards ("PCBs"). For example, the thermal detection device 500 includes a main PCB 505 interconnected with a thermal sensor PCB 510, an environmental PCB 515A, an environmental PCB 515B, a visual sensor PCB 520, a display PCB 525, and a keypad PCB 530. Each PCB includes associated modules. For example, the main PCB 505 includes a main control unit 535, a universal serial bus ("USB") module 540, a SDRAM memory module 545, a flash memory module 550, a clock module 555, an oscillator module 560, a thermocouple module 565, a keypad and battery control unit 570, and a battery module 575. In some embodiments, the thermocouple module 565 is connected to another of the PCBs in the thermal detection device 500. The thermocouple 565 can include a cold junction sensor (e.g., a cold junction temperature sensor). The thermal sensor PCB 510 includes a thermal sensor 580 and a thermal sensor control unit 585. The environmental PCBs 515A and 515B each include an ambient temperature sensor module 590, a humidity sensor module 595, and a worklight module 600. The visual sensor PCB 520 includes a visual sensor module 605. The display PCB 525 includes a display module 610, and the keypad PCB 530 includes a keypad module 615. Although the PCBs 510-530 are each illustrated as being separate from and connected to the main PCB 505, in some embodiments of the invention, one or more of the PCBs 510-530 are integrated into the same PCB. In some embodiments, the thermal detection device 500 includes three microprocessors (e.g., one connected to the thermal sensor PCB 510, one connected to the main PCB 505, and another connected to any one of the PCBs).

The battery module 575 is electrically connected to the battery pack 110 for receiving power. The battery module 575 includes electrical components (e.g., resistors, capacitors, diodes, transistors, amplifiers, etc.) to regulate and condition power for the various modules and components within the thermal detection device 500. For example, the battery module 575 is configured to produce a variety of different levels of voltage for the various modules and components of the thermal detection device 500 depending on the power requirements of the various modules and components. In some embodiments, the battery module 575 produces regulated and conditioned voltages between approximately 0.7 volts and 12.0V.

Power from the battery module 575 is distributed to various modules and components within the thermal detection device 500. In some embodiments, the battery module 575 continuously provides power to, for example, the control unit 535 when the thermal detection device 500 is powered up (i.e., turned on). Additionally or alternatively, the battery module 575 does not provide power to various modules or components until a signal from the control unit 570 or 535 indicating that power should be supplied to the module or components is received. For example, the worklight module 600 does not receive power from the battery module 575 until the battery module 575 receives an indication from the control unit 570 or 535 that the worklight module 600 is to receive power. In other embodiments, the user activates or selects a button to open or close a switch to provide power to one or more of the modules (e.g., closing a switch to power the worklight module 600). The battery module 575 can also be directly connected to various others of the modules or PCBs within the thermal detection device 500. The battery module 575 is controlled by the keypad and battery control unit 570. For example, the control unit 570 can be configured to control a voltage or current output of the battery module 575.

The keypad module 615 includes or receives signals from a plurality of switches (e.g., buttons) associated with the control and operation of the thermal detection device 500 (e.g., selecting temperature ranges for display, selecting display colors or color palettes, selecting or setting image review options, selecting operational modes, selecting display modes, selecting displayed information, etc.). The switches are located in, for example, the user input portion 130. The keypad module 615 includes, for example, a power button for turning the thermal detection device 500 on and off, a review button for reviewing capture images, a worklight button for turning the LED worklight on and off, a toggle button for toggling between a visual image display mode and a blended image display mode, a menu button for accessing one or more menus of the thermal detection device 500, navigation buttons (e.g., up, down, left, right, etc.) for navigating through the one or more menus or stored images, a trigger for capturing images, and a select button for making one or more selections from, for example, the one or more menus. In some embodiments, any of the above buttons can be combined such that a single button has multiple functions (e.g., the select button is also used to turn the thermal detection device 500 on and off, etc.).

As an illustrative example, the keypad module 615 receives signals from the trigger portion 120. The actuation or depression of the trigger portion 120 generates a signal which is received by the keypad module 615 and is indicative of a desire to capture an image of a scene. The keypad module 615 sends the signal to the control unit 570 or 535 to cause the thermal image to be captured. Similarly, control buttons related to the operational mode or display mode of the thermal detection device 500 generate signals that are received by the keypad module 615. The keypad module 615 transmits the signals to the control unit 570 or 535 to correspondingly control the operational or display mode of the thermal detection device 500. For example, the thermal detection device 500 can include a "hot key" or toggle to switch between images that were captured using the thermal detection device 500. In some embodiments, the hot key is a physical button that is actuated to uni-directionally scroll through captured images. In other embodiments, two or more buttons are used to scroll through captured images in multiple directions (e.g., forward, reverse, etc.). To facilitate the review of images on the thermal detection device 500, the buttons can be used to access a folder or directory view of stored images which allows the user to access and view images which were previously captured using the thermal detection device 500. In some embodiments, the keypad module 615 is included in or integrated with the display module 610 (e.g., when the display module 610 includes a touch-screen display). The keypad module 615 is also controlled by the keypad and battery control unit 570. For example, the control unit 570 can be configured to receive process, evaluate, and/or interpret signals received from the keypad module 615.

The visual sensor module 605 includes or receives signals from one or more visual sensors as described above. The visual sensor module 605 sends electrical signals corresponding to a sensed visual scene to the control unit 535 for processing, or directly to the display module 610 for display. The visual sensor module 605 receives power from the battery module 575 and is configured to receive one or more control signals from the control unit 535. For example, the control unit 535 provides the visual sensor module 605 with one or more signals corresponding to settings of the one or more visual sensors. The settings of the visual sensors can include brightness, contrast, etc. In some embodiments, the visual sensor module 605 receives signals from the thermal sensor 580 or thermal sensor control unit 585. The visual sensor module 605 uses these signals as feedback and adjusts settings of the visual sensors in response. Alternatively, the control unit 535 receives the signal from the thermal sensor 580 or control unit 585, determines what changes should be made to the operation of the visual sensor, and sends signals to the visual sensor module 605 to modify one or more settings.

The thermal sensor control unit 585 receives signals from and transmits signals to the thermal sensor 580. The signals received from the thermal sensor 580 include, for example, output signals related to the amount of thermal radiation detected by the thermal sensor 580. The signals transmitted by the thermal sensor control unit 585 to the thermal sensor 580 include, for example, temperature compensation signals, as described below. In some embodiments, the thermal sensor control unit 585 is configured to perform signal conditioning and processing on the output signals received from the thermal sensor 580. In other embodiments, and as described below, the signal conditioning and processing can also be performed by the control unit 535. The signal conditioning and processing includes, among other things, upscaling (e.g., interpolation), temperature compensation, normalization, etc. In some embodiments, the thermal sensor control unit 585 is included in the thermal sensor 580 or the control unit 535.

The display module 610 receives control signals from the control unit 535 and power from the battery module 575 sufficient to illuminate, for example, one or more LEDs or a display which provides an indication of a result of a test. Among the signals received from the control unit 535 are signals related to a display mode. For example, the display module is configured to operate in any of a variety of display modes, such as a thermal image display mode, a visual image display mode, and a combined display mode. The display module 610 is switched among the display modes by way of, for example, one or more control signals received by the keypad module 615 (e.g., corresponding to one or more buttons being pressed or switches being activated). The display module 610 is configured to remain in a selected display mode until the user activates another button or switch indicative of a desire to change the display mode. Additional display modes include a review mode for reviewing captured images, and a menu mode in which one or more menus are displayed.

Included in the display are, for example, measured temperatures, average temperatures, ambient temperatures, indications of a detection area, a distance to a target, etc. The display also includes a crosshair positioned at the center of the display. The crosshair is used as a reference point within the displayed scene. A variety of additional display functions are based on the position of the crosshair in the displayed scene. For example, a temperature within a scene or an average temperature of a portion of the scene corresponding to the location of the crosshair is displayed on the display (e.g., in a corner of the display). In some embodiments, a circle or square is drawn around the crosshair which corresponds to, for example, approximately a 1.0° FOV about the crosshair. In other embodiments, any of a variety of polygons are used which correspond to a FOV about the crosshair. The polygon surrounding the crosshair is indicative of the approximate sensed area for the thermal sensor, or at least a portion of the sensed area for which a temperature can be reliably determined. Accordingly, the polygon is resized based on the distance of the thermal sensor from a target within a scene. The approximate distance of the thermal sensor from the target within the scene is determined using, for example, a laser rangefinder or another similar distancing technique.

The ambient temperature sensor module 590 measures the ambient temperature of the thermal detection device 500, the ambient temperature of the thermal sensor 580, the thermal sensor PCB 510, a sub-housing 625 (see FIGS. 8-12), the ambient temperature of the area surrounding the thermal detection device 500, and/or the ambient temperature of other components of the thermal detection device 500 (e.g., one or more PCBs, etc.). The humidity sensor 595 measures the relative humidity of the environment surrounding the thermal detection device 500.

The worklight module 600 is connected to the worklight button described above. When the user activates the worklight button, a signal is provided to the control unit 535. The control unit 535 selectively provides power from the battery module 575 to the worklight module 600 for illuminating the worklight portion 230.

The worklight portion 230 provides a convenient source of light when operating the thermal detection device 500, because the thermal detection device 500 is sometimes used in dark environments; light from the worklight portion 230 can be used to provide sufficient illumination for the visual sensor(s). In some embodiments, the worklight includes an incandescent light bulb, one or more LEDs, or the like. In one embodiment, the worklight includes three high-intensity LEDs and has an output of, for example, 250 LUX at a distance of two feet. As such, the worklight portion 230 is sufficiently powerful to illuminate an area in front of the thermal detection device 500. In some embodiments of the invention, the output of the worklight is greater than 250 LUX at a distance of two feet.

The worklight portion 230 is either integral to or detachable from the thermal detection device 500. In embodiments of the invention in which the worklight portion 230 is detachable from the thermal detection device 500, the worklight portion 230 includes a secondary power source, and the thermal detection device 500 and the worklight portion 230 include corresponding interfaces for attachment and detachment (e.g., flanges, tongues and grooves, magnets, etc.). The secondary power source is, for example, a battery that is electrically isolated from the thermal detection device 500, charged by the thermal detection device 500, or otherwise receives power from the thermal detection device 500 (e.g., wirelessly). The worklight also includes a worklight timeout period. The worklight timeout period has a preprogrammed value or the value is set by the user. If the worklight timeout period is reached or lapses and the worklight portion 230 has not been turned off, the worklight portion 230 is turned off to conserve power. In some embodiments, the worklight portion 230 is positioned at the front end of the thermal detection device 500, is below the thermal sensor 580, and is covered by a clear plastic shield for protection.

The main PCB 505 includes one or more ports for, among other things, storing or retrieving data from the thermal detection device 500. For example, main PCB 505 includes one or more USB ports connected to or included in the USB module 540. Additionally or alternatively, the main PCB 505 includes one or more SD card slots, one or more FireWire ports, a serial port, a parallel port, etc., having corresponding modules connected to the control unit 535. In some embodiments, the thermal detection device 500 includes an ability to transmit or receive information over a wireless short-range communications network employing a protocol such as, for example, Bluetooth, ZigBee, Wi-Fi, or another suitable short-range communications protocol. The USB module 540 or flash memory module 550 allow a user to retrieve images stored in an internal memory of the thermal detection device 500 and transfer them to, for example, a personal computer, phone, laptop, PDA, tablet computer, e-book reader, television, or the like. The images are stored as a file type such as JPEG, TIFF, PNG, GIF, BMP, etc. In some embodiments, the thermal detection device 500 includes a limited amount of memory, and a removable memory is inserted into the thermal detection device 500 to store captured images. The flash memory can be removed from the thermal detection device 500 and inserted into a corresponding port on any of the previously mentioned devices. In some embodiments, the thermal detection device 500 is configured to capture still images and store them to the flash memory module 550 or another suitable memory of the thermal detection device 500. In other embodiments, the thermal detection device 500 is configured to capture still images and video of a scene. In embodiments of the invention in which the flash memory module 550 is the only or primary storage medium, the absence of a flash memory in the thermal detection device 500 may prevent the thermal detection device 500 from being able to store images. In embodiments of the thermal detection device 500 that include both a flash memory slot and a USB port, and a flash memory is present in the flash memory module 550, inserting a USB cable into the USB port can cause the images stored on the flash memory module 550 to be automatically downloaded to, for example, a computer. The main PCB 505 also includes SDRAM in the SDRAM module 545, a clock in the clock module 555, and an oscillator in the oscillator module 560 for executing instructions stored in firmware of the control unit 535 during the operation of the thermal detection device 500.

With continued reference to FIG. 7, the control unit 535 is configured to perform a variety of compensation functions for the thermal detection device 500. For example, the thermal sensor 580 is highly sensitive to variations in temperature (e.g., ambient temperature). The pixels of the thermal sensor 580 also do not change uniformly. The pixels along the edges of the thermal sensor 580 have a tendency to be affected by variations in ambient temperature more quickly than the pixels at the interior of the thermal sensor 580. To compensate for these effects, the control unit 535 includes (e.g., stores in a memory) or generates a thermal map or a thermal gradient map for the thermal sensor 580. The map corresponds to the manner in which each pixel of the thermal sensor 580 is affected by variations in temperature. The map is then used to compensate the output pixel values for each pixel of the thermal sensor 580. In some embodiments, the control unit 535 detects a rate at which the ambient temperature of the thermal detection device 500 or the environment around the thermal detection device 500 is changing. The rate at which the ambient temperature is changing is used to modify, for example, the rate at which the output of the thermal sensor 580 is compensating, a thermal map that is being used for compensation, etc.

In some embodiments, the ambient temperature of the thermal detection device 500, the ambient temperature of the thermal sensor 580, or the temperature of one or more pixels of the thermal sensor 580 is adjusted by the control unit 535 such that it matches a temperature of a target within a scene. Heat can be applied to each pixel in the thermal sensor 580 or the peripheral pixels in the thermal sensor 580 to adjust the temperature of the thermal sensor 580. In some embodiments, one or more additional temperature sensors are include within the thermal detection device 500 to monitor the internal temperature of the thermal detection device 500 (e.g., the temperature of the main PCB 505, the temperature of the thermal sensor PCB 510, the internal ambient temperature of the thermal detection device 500, etc.). For example, an array of temperature sensors 581 are positioned around the thermal sensor 580 (e.g., around the edges of the thermal sensor 580) to sense the temperature of one or more pixels in the thermal sensor 580. The output signals from the temperature sensors 581 are used to determine which portions of the thermal sensor 580 are different from the temperature of the target within the scene. In some embodiments, the temperature sensors 581 are used in combination with a thermal gradient map for the thermal sensor 580 to determine which portions of the thermal sensor 580 need to be heated or cooled to match the temperature of the target within the scene. Additionally or alternatively, the control unit 535 is configured to match the ambient temperature of the thermal detection device 500, the ambient temperature of the thermal sensor 580, or the temperature of one or more pixels of the thermal sensor 580 to an ambient temperature or average temperature of an environment near the thermal detection device 500.

In some embodiments, a second thermopile array 582 is used to source heat to the thermal sensor and control the temperature of the thermal sensor 580. Although additional power is required to, for example, supply heat to the thermal sensor 580 to match the temperature of the target within the scene, the use of a higher power battery pack 110 (e.g., 12V) enables the thermal detection device 500 to perform the temperature matching without sacrificing other features or functions of the thermal detection device 500.

The control unit 535 is also configured to perform a variety of calibration functions for the thermal detection device 500. For example, the control unit 535 has a memory that includes stored factory calibration information for the thermal sensor. When the thermal detection device 500 is turned on, a self calibration and warm up is executed. In some embodiments, the control unit 535 includes a combination of software and hardware for calibrating the thermal sensor during use and without a shutter. In other embodiments, the control unit 535 includes a combination of software and hardware for calibrating the thermal sensor during use and with the use of a shutter. For example, in some embodiments which do not include a shutter, the control unit 535 computes calibration constants from raw calibration readings from the thermal sensor 580. The calibration constants can then be stored in memory and recomputed for each new power cycle (e.g., after the thermal detection device 500 is turned on).

Specifically, calibration points corresponding to 0° C., 5° C., 25° C., 30° C., 50° C., and 100° C. can be used to determine pixel gain values or constants that are used to determine temperatures within a scene and ensure accurate temperature readings throughout the normal operating temperature range for the device. From these pixel gain values for the various calibration points, additional pixel gain values can be interpolated by the main control unit 535 based on, for example, one or more temperature readings (e.g., from the environmental PCBs 515A or 515B and corresponding ambient temperature sensors). In some embodiments, one or more pairs of calibration points are used to determine pixel gain values.

Additionally, in some embodiments, pixel gain has a strong dependence on the location of the pixels on the thermopile array's surface. For example, the shape of the lens, aperture, and other optical elements can affect the pixel gain values throughout the thermopile array. In some embodiments, the pixels located around the edges of the thermal sensor and in the corners of the thermal sensor also have lower signal-to-noise ratios than pixels in the center of the thermopile array. A mapping of the sensitivity of each or groups of pixels based on their location in the thermopile array can be used to compensate for the differences in sensitivity or signal-to-noise ratio in a similar manner as described above with respect to the thermal map.

Heat from, among other things, the thermal sensor control unit 585 and internal and external voltage reference signals can also affect the readings from the thermal sensor. For example, heat can affect the column amplifier of the thermal sensor and result in artifacts being present in the outputted thermal sensor data. The effects of the heat on the column amplifier can be corrected in a variety of ways. For example, the pixel gain value at each temperature calibration point can be assumed to contain both an amplifier offset for the column and a pixel thermal offset. Alternatively, a common voltage, $V_{COMMON}$, can be subtracted from the amplifier offset for the column and the pixel thermal offset readings. The amplifier offset for the column can then be subtracted from the pixel thermal offset to reduce the effects of column electrical drift.

The control unit 535 is also configured to perform additional functions and processing related to the operation of the thermal detection device 500. As described above, the user is able to select among a variety of operational modes, display modes, etc. The display modes include a visual sensor mode, a thermal sensor mode, and a blended mode. The blended mode of operation combines signals received from the thermal sensor and signals received from the visual sensor into a combined or blended image which is capable of being displayed on the display. The visual sensor has a resolution of, for example, 160 pixels by 160 pixels (160× 160). The thermal sensor (e.g., thermopile array) has a resolution of, for example, 32 pixels by 32 pixels (32×32), 64 pixels by 64 pixels (64×64), 128 pixels by 128 pixels (128×128), less than 32 pixels by 32 pixels, less than 64 pixels by 64 pixels, less than 128 pixels by 128 pixels, less than 160 pixels by 160 pixels, etc. When combining the signals from the visual sensor and the thermal sensor, the output of the thermal sensor can be up-scaled to match the size of the visual sensor (e.g., 160×160). The output of the thermal sensor 580 is up-scaled using any of a variety of techniques, such as averaging of the closest data points, nearest neighborhood techniques, linear interpolation, pixel replication, bilinear interpolation, bicupic interpolation, contrast stretching, edge detection/enhancement, MTF peaking, integration, cubic convolution, sync filters, bidirectional quadratic convolution, and cubic spline interpolation. The up-scaled output of the thermal sensor 580 and the output of the visual sensor 605 can be combined or blended in one or more of a variety of ways, such as, for example, a multiply blend mode, a screen blend mode, overlay blend mode (e.g., visual image is overlayed on top of thermal image), a U-shaped or parabolic blend mode (e.g., to under-emphasize neutral temperatures near an ambient temperature), a soft light blend mode, a hard light blend mode, a dodge blend mode, a color dodge blend mode, a linear dodge blend mode, a burn blend mode, a color burn blend mode, a linear burn blend mode, a divide blend mode, an addition blend mode, a subtraction blend mode, a difference blend mode, a darken only blend mode, etc. Contrast enhancement can also be performed on the visual and thermal images to increase the quality of the displayed image. In some embodiments, a software offset registration can be performed by the control unit 535 to ensure that the visual image and the thermal image are properly aligned for blending. For example, Bresenham's line algorithm can be used or modified to by the control unit 535 to correct for pixel offset. In some embodiments, sequential programming is used in place of a programmable logic device to generate a blended thermal image for display on the display 610 of the thermal detection device 500.

In some embodiments, each pixel in the output of the visual sensor 605 and each pixel in the up-scaled output of the thermal sensor 580 is assigned a numerical value corresponding to an 8-bit color (i.e., a value between 0 and 255). The values for each pixel of the output from the visual sensor and the values for each pixel of the up-scaled output of the thermal sensor 580 are then proportioned, combined, and normalized to generate an output image signal.

In other embodiments, different normalization techniques can be used. For example, only pixels corresponding to temperatures within, for example, a +/−5° or +/−10° window around the ambient temperature are displayed. The ambient temperature sensor 590 is used to determine the ambient temperature of a scene being imaged or the ambient temperature of the environment around the thermal detection device 500. The output pixel values are then scaled such that all colors correspond to the window around the ambient temperature. Such an implementation prevents pixels from displaying extreme temperatures and washing out images. In some embodiments, the blending is only performed for portions of the scene within predefined temperature ranges (e.g., 40°-80°), or only the portions of a scene within a predefined or predetermined FOV of the thermal sensor are blended. In other embodiments, a similar normalization procedure is performed, but an average temperature of a scene is determined (e.g., either an actual average temperature or an averaging of the pixel values for the output of the thermal sensor). Although the display colors are generally displayed according to the visual color spectrum (i.e., from red to blue or violet), in some embodiments, the user is able to adjust or modify the colors at which certain temperatures or pixel values are displayed.

In some embodiments, the control unit 535 precomputes or stores a color map that is used to generate a thermal image. For example, the color map is a square array of 32 colors, 64 colors, 128 colors, 256 colors, etc. A value for the visual intensity of a pixel is determined based on signals from the visual sensor 605, a value for the thermal intensity is determined based on signals from the thermal sensor 580, and the two values are used to look up a corresponding color. In such an implementation, the color map can replace mathematical calculations for determining a corresponding pixel display color.

FIGS. 8-12 illustrate a thermal sensor assembly 620. The thermal sensor assembly 620 includes the main PCB 505, the thermal sensor PCB 510, the thermal sensor 580, the visual sensor 605, the keypad PCB 530, the visual sensor PCB 520, environmental PCBs 515A and 515B, the thermocouple 565, and the display PCB 525 or LCD panel. In the illustrated embodiment, the thermal sensor 580 is positioned forward of and parallel to the thermal sensor PCB 510. The thermal sensor 580 and the thermal sensor PCB 510 are connected to or located at least partially within a housing or a sub-housing 625. The sub-housing 625 encloses the thermal sensor PCB 510 and is made of metal, such as aluminum (e.g., the sub-housing is wholly made of metal, each side surface of the sub-housing is made of metal, at least one side surface of the sub-housing is made of metal, at least two side surfaces of the sub-housing are made of metal, etc.). In some embodiments, the main PCB 505 is enclosed within the same sub-housing 625 as the thermal sensor PCB 510. In other embodiments, the main PCB 505 and the thermal sensor PCB 510 are included in different sub-housings (e.g., different metal sub-housings). As such, the housing 625 functions as a heat sink to dissipate heat generated by the thermal detection device and stabilize the temperature of the thermal sensor 580 and the internal temperature of the thermal detection device 500. In other embodiments, the housing 625 is partially or wholly made of plastic.

The visual sensor 605 is positioned above the thermal sensor 580. The visual sensor PCB 520 is positioned or located above the thermal sensor 580 and the visual sensor 605. The visual sensor PCB 520 is approximately perpendicular to the thermal sensor PCB 510 and the housing 625. The environmental PCB 515A is positioned above and approximately parallel to the visual sensor PCB 520, and the environmental PCB 515B is positioned below and approximately parallel to the visual sensor PCB 520. The main PCB 505 is positioned or located behind (e.g., spaced apart from) the thermal sensor 580 and the sub-housing 625. In the illustrated embodiment, the main PCB 505 forms an acute angle with respect to the thermal sensor PCB 510. The angle between the thermal sensor PCB 510 and the main PCB 505 is, for example, between approximately 0° (e.g., +/−3°) and approximately 30° (e.g., +/−3°). In other embodiments, the main PCB 505 is approximately or substantially parallel to the thermal sensor PCB 510. The main PCB 505 is connected to the display PCB 525 to provide drive signals to the display PCB 525. For example, the main PCB 505 provides one or more image or video signals related to a scene (e.g., an environment surrounding the thermal detection device 500), one or more signals related to a measured characteristic of the scene (e.g., a temperature), one or more signals related to a status of the thermal detection device 500, etc. The signals from the main PCB 505 are then used to generate a visual display corresponding to the signals and for a user to view. In the illustrated embodiment, the display PCB 525 is approximately or substantially parallel to the main PCB 505. For example, the angle between the display PCB 525 and the main PCB 505 is, for example, between approximately 0° (e.g., +/−3°) and approximately 30° (e.g., +/−3°). In other embodiments, the display PCB 525 is approximately or substantially parallel to the main PCB 505 (e.g., +/−3°).

Also included between the main PCB 505 and the display PCB 525 is the thermocouple 565. The thermocouple 565 is connected to the main PCB 505 to provide signals related to a contact temperature measurement of an object or scene. The keypad PCB 530 is positioned or located below the display PCB 525 and the main PCB 505. The keypad PCB 530 includes a variety of user inputs (e.g., buttons) as described above. The keypad PCB 530 and forms an obtuse angle with respect to the display PCB 525. The angle between the keypad PCB 530 and the display PCB 525 is between, for example, approximately 90° (e.g., +/−3°) and approximately 180° (e.g., +/−3°). The angle between the keypad PCB 530 and the display PCB 525 enhances the operation of the thermal detection device 500 by allowing a user to view the display portion 135 and operate the user input portion 130 while gripping the thermal detection device 500 in one hand and inspecting the scene.

Thus, the invention provides, among other things, a thermal detection device that includes a visual sensor, a thermal sensor, and a display. Various features and advantages of the invention are set forth in the following claims.

What is claimed is:

1. A thermal detection device comprising:
an outer housing;
a visual camera configured to generate a first signal related to a visual image of a scene;
a first thermopile array including a first plurality of pixels;
an array of temperature sensors positioned around the first thermopile array;
a first control unit including a processor and a first memory, the first control unit connected to the first thermopile array and configured to generate a second signal related to a thermal image of the scene, the second signal associated with a temperature sensed by at least one of the first plurality of pixels in the first thermopile array;
a second control unit including a processor and a second memory, the second control unit electrically connected to the visual camera and the first control unit, the second control unit configured to:
receive the second signal from the first control unit, receive one or more output signals from the array of temperature sensors related to a temperature of the first thermopile array, generate a thermal map of the first plurality of pixels in the first thermopile array based on the one or more output signals from the array of temperature sensors, the thermal map related to how each pixel of the first thermopile array is affected by variations in temperature, and compensate the second signal based on the thermal map, and a display configured to display the visual image based on the first signal and the thermal image based on the compensated second signal.

2. The thermal detection device of claim 1, further comprising a second thermopile array including a second plurality of pixels; and wherein the second control unit is further configured to adjust a temperature, using the second thermopile array, of the at least one of the first plurality of pixels in the first thermopile array, the temperature adjusted based on the thermal map.

3. The thermal detection device of claim 1, wherein a removable and rechargeable battery pack is configured to be inserted into a handle portion of the outer housing for providing power to the thermal detection device.

4. The thermal detection device of claim 1, wherein the first thermopile array has a resolution of less than or equal to 160 pixels by 160 pixels.

5. The thermal detection device of claim 4, wherein the first thermopile array has a resolution of less than or equal to 64 pixels by 64 pixels.

6. The thermal detection device of claim 1, wherein the thermal detection device does not include a shutter.

7. The thermal detection device of claim 6, wherein one of the first control unit and the second control unit is further configured to access, from one of the first memory and the second memory, a pixel gain value for each of the first plurality of pixels within the first thermopile array.

8. The thermal detection device of claim 7, wherein one of the first control unit and the second control unit is further configured to calculate new pixel gain values for each of the first plurality of pixels within the first thermopile array based on the accessed pixel gain values and a condition of the thermal detection device.

9. The thermal detection device of claim 8, wherein the condition of the thermal detection device is the temperature related to the first thermopile array.

10. The thermal detection device of claim 8, wherein the pixel gain value includes an amplifier offset and a pixel thermal offset.

11. The thermal detection device of claim 10, wherein a common voltage is subtracted from the amplifier offset and the pixel thermal offset.

12. The thermal detection device of claim 1, wherein one of the first control unit and the second control unit are configured to up-scale the thermal image to match the size of the visual image.

13. The thermal detection device of claim 12, wherein the thermal image is up-scaled using at least one of: averaging of the closest data points, nearest neighborhood techniques, linear interpolation, pixel replication, bilinear interpolation, bicupic interpolation, contrast stretching, edge detection/enhancement, MTF peaking, integration, cubic convolution, sync filters, bidirectional quadratic convolution, and cubic spline interpolation.

14. The thermal detection device of claim 1, further comprising a first ambient temperature sensor, and a second ambient temperature sensor, the first ambient temperature sensor providing the temperature signal to the second control unit, the second ambient temperature sensor providing a second temperature signal to the second control unit.

15. A thermal detection device comprising:
an outer housing;
a visual camera;
a first thermopile array including a first plurality of pixels;
an array of temperature sensors positioned around the first thermopile array;
a controller including a processor and a memory, the controller configured to:
receive a first signal from the visual camera related to a visual image of a scene,
receive a second signal from the first thermopile array related to a thermal image of the scene, the second signal associated with a temperature sensed by at least one of the first plurality of pixels in the first thermopile array;
receive one or more output signals from the array of temperature sensors related to a temperature of the first thermopile array,
generate a thermal map of the first plurality of pixels in the first thermopile array based on the one or more output signals from the array of temperature sensors, the thermal map related to how each pixel of the first thermopile array is affected by variations in temperature,
map a sensitivity of one or more groups of pixels of the first plurality of pixels in the first thermopile array within the thermal map, and
compensate the second signal based on the mapped sensitivity; and
a display configured to display the visual image based on the first signal and the thermal image based on the compensated second signal.

16. The thermal detection device of claim 15, wherein compensating the second signal comprises compensating for differences in sensitivity between the one or more groups of pixels.

17. The thermal detection device of claim 15, wherein one of the first control unit and the second control unit is further configured to access, from one of the first memory and the second memory, a pixel gain value for each of the first plurality of pixels within the first thermopile array.

18. The thermal detection device of claim 17, wherein one of the first control unit and the second control unit is further configured to calculate new pixel gain values for each of the first plurality of pixels within the first thermopile array based on the accessed pixel gain values and a condition of the thermal detection device.

19. The thermal detection device of claim 18, wherein the condition of the thermal detection device is the temperature related to the first thermopile array.

20. The thermal detection device of claim 18, wherein the pixel gain value includes an amplifier offset and a pixel thermal offset.

* * * * *